(12) United States Patent
Takemura et al.

(10) Patent No.: US 12,125,475 B2
(45) Date of Patent: *Oct. 22, 2024

(54) INFORMATION PROCESSING DEVICE, INFORMATION PROCESSING METHOD, AND PROGRAM

(71) Applicant: SATURN LICENSING LLC, New York, NY (US)

(72) Inventors: Tomoaki Takemura, Tokyo (JP); Shinya Masunaga, Tokyo (JP); Koji Fujita, Tokyo (JP); Katsutoshi Ishiwata, Kanagawa (JP); Kenichi Ikenaga, Tokyo (JP); Katsutoshi Kusumoto, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,105

(22) Filed: May 1, 2023

(65) Prior Publication Data
US 2023/0267920 A1    Aug. 24, 2023

Related U.S. Application Data

(63) Continuation of application No. 17/386,260, filed on Jul. 27, 2021, now Pat. No. 11,676,578, which is a
(Continued)

(30) Foreign Application Priority Data

Dec. 28, 2012    (JP) .................................. 2012-287357

(51) Int. Cl.
*G10L 15/187*    (2013.01)
*G06F 40/166*    (2020.01)
(Continued)

(52) U.S. Cl.
CPC ............ *G10L 15/08* (2013.01); *G06F 40/166* (2020.01); *G06F 40/242* (2020.01);
(Continued)

(58) Field of Classification Search
None
See application file for complete search history.

(56) References Cited

U.S. PATENT DOCUMENTS 5,696,962 A * 12/1997 Kupiec ............... G06F 16/3338
707/999.005
6,594,630 B1 * 7/2003 Zlokarnik ............... G10L 15/26
704/E15.045
(Continued)

FOREIGN PATENT DOCUMENTS

CN    101939740 A    1/2011
CN    102282609 A    12/2011
(Continued)

OTHER PUBLICATIONS

Extended European Search Report issued Jul. 13, 2016 in Patent Application No. 13867146.6.

*Primary Examiner* — Seong-Ah A Shin
(74) *Attorney, Agent, or Firm* — Oblon, McClelland, Maier & Neustadt, L.L.P.

(57) ABSTRACT

There is provided an information processing device including an analysis unit configured to analyze a character string indicating contents of utterance obtained as a result of speech recognition, and a display control unit configured to display the character string indicating the contents of the utterance and an analysis result on a display screen.

12 Claims, 12 Drawing Sheets

Related U.S. Application Data continuation of application No. 16/523,675, filed on Jul. 26, 2019, now Pat. No. 11,100,919, which is a continuation of application No. 14/648,890, filed as application No. PCT/JP2013/081312 on Nov. 20, 2013, now Pat. No. 10,424,291.

(51) Int. Cl.
| | | |
|---|---|---|
| *G06F 40/242* | (2020.01) | |
| *G06F 40/268* | (2020.01) | |
| *G06F 40/30* | (2020.01) | |
| *G10L 15/08* | (2006.01) | |
| *G10L 15/22* | (2006.01) | |
| *G10L 17/22* | (2013.01) | |
| *G10L 15/26* | (2006.01) | |

(52) U.S. Cl.
CPC ............ *G06F 40/268* (2020.01); *G06F 40/30* (2020.01); *G10L 15/22* (2013.01); *G10L 17/22* (2013.01); *G10L 2015/221* (2013.01); *G10L 15/26* (2013.01)

(56) References Cited

U.S. PATENT DOCUMENTS

| | | | | |
|---|---|---|---|---|
| 7,165,098 B1* | 1/2007 | Boyer | ................ | H04N 21/4782 709/219 |
| 7,440,893 B1* | 10/2008 | Gorin | ..................... | G10L 15/22 704/E15.04 |
| 7,929,767 B2* | 4/2011 | Xu | ..................... | G06V 30/1423 382/187 |
| 8,019,602 B2* | 9/2011 | Yu | ........................ | G10L 15/065 704/235 |
| 8,370,130 B2* | 2/2013 | Yun | ...................... | G06F 40/268 704/4 |
| 8,522,283 B2* | 8/2013 | Laligand | .......... | H04N 21/42203 725/115 |
| 8,660,849 B2* | 2/2014 | Gruber | .................. | G06N 5/041 340/988 |
| 9,367,608 B1* | 6/2016 | Zhang | ................. | G06F 16/3331 |
| 9,436,951 B1* | 9/2016 | Jablokov | ............... | G06F 16/632 |
| 9,852,136 B2* | 12/2017 | Venkataraman | ........ | G06F 16/48 |
| 2007/0073540 A1 | 3/2007 | Hirakawa et al. | | |
| 2007/0213979 A1* | 9/2007 | Meermeier | ............ | G10L 15/22 704/E15.04 |
| 2008/0270449 A1* | 10/2008 | Gossweiler | ............ | H04N 21/47 707/999.102 |
| 2009/0150156 A1* | 6/2009 | Kennewick | ......... | G01C 21/3608 704/275 |
| 2009/0210411 A1* | 8/2009 | Murata | ............... | G06F 16/3334 707/999.005 |
| 2009/0313014 A1* | 12/2009 | Shin | ........................ | G10L 15/22 704/235 |
| 2010/0153885 A1* | 6/2010 | Yates | ................... | G06F 16/7867 707/723 |
| 2011/0013756 A1* | 1/2011 | Davies | .................... | G10L 15/22 379/88.14 |
| 2012/0034904 A1* | 2/2012 | LeBeau | ................ | H04W 4/046 455/414.1 |
| 2012/0245944 A1* | 9/2012 | Gruber | .................... | G10L 15/26 704/270.1 |
| 2012/0253804 A1* | 10/2012 | Sugiura | ................ | G10L 15/187 704/235 |
| 2012/0296647 A1* | 11/2012 | Kobayashi | ............. | G06F 3/018 704/235 |
| 2012/0304057 A1* | 11/2012 | Labsky | .................. | G10L 13/00 715/256 |
| 2013/0006629 A1* | 1/2013 | Honda | ................. | G10L 15/187 704/E15.001 |
| 2013/0013305 A1* | 1/2013 | Thompson | .............. | G06F 16/78 704/235 |
| 2013/0021346 A1* | 1/2013 | Terman | .................... | G09B 5/08 345/467 |
| 2013/0035941 A1* | 2/2013 | Kim | ...................... | G06F 3/017 704/E21.001 |
| 2013/0073293 A1* | 3/2013 | Jang | ........................ | G10L 15/22 704/E21.001 |
| 2014/0337370 A1* | 11/2014 | Aravamudan | .......... | G10L 15/22 707/759 |
| 2015/0134333 A1* | 5/2015 | Sim | ........................ | G10L 15/22 704/246 |
| 2015/0302850 A1* | 10/2015 | Lebrun | ................... | G06F 40/35 704/243 |
| 2016/0132293 A1* | 5/2016 | Ballinger | ................ | G10L 15/26 704/8 |
| 2016/0210966 A1* | 7/2016 | Koganei | ................ | G10L 15/22 |
| 2016/0328206 A1* | 11/2016 | Nakaoka | ............... | G06F 16/9566 |
| 2017/0006329 A1* | 1/2017 | Jang | .................... | H04N 21/4782 |
| 2017/0068551 A1* | 3/2017 | Vadodaria | ............ | G06Q 10/107 |
| 2017/0278514 A1* | 9/2017 | Mathias | .................. | G06F 16/35 |
| 2017/0329790 A1* | 11/2017 | Johns | .................... | G06F 3/0482 |
| 2018/0336895 A1* | 11/2018 | Aleksic | ................ | G06F 40/295 |

FOREIGN PATENT DOCUMENTS

| | | |
|---|---|---|
| CN | 102737100 A | 10/2012 |
| CN | 102792320 A | 11/2012 |
| JP | 2001166914 | 6/2001 |
| JP | 2009239466 | 10/2009 |
| JP | 2009252238 | 10/2009 |
| JP | 2010134074 | 6/2010 |
| JP | 2012063526 | 3/2012 |
| JP | WO 2014/103568 A1 | 7/2014 |
| WO | 2011/088053 A2 | 7/2011 |
| WO | 2012/167168 A2 | 12/2012 |

* cited by examiner

| Keyword | Type |
|---|---|
| VERB(watch) | Action.PLAY |
| NOUN(watch) | Action.PLAY |
| VERB(tune) | Action.PLAY |
| NOUN(tune) | Action.PLAY |
| VERB(change) | Action.PLAY |
| NOUN(change) | Action.PLAY |
| VERB(jump) | Action.PLAY |
| NOUN(jump) | Action.PLAY |
| VERB(listen) | Action.LISTEN |
| NOUN(listen) | Action.LISTEN |
| VERB(record) | Action.RECORD |
| NOUN(record) | Action.RECORD |
| VERB(launch) | Action.LAUNCH |
| NOUN(launch) | Action.LAUNCH |
| ... | |

B:

| Keyword | Type |
|---|---|
| VERB(mi/ta/i) | Action.PLAY |
| VERB(ki/ki/ta/i) | Action.LISTEN |
| VERB(ki/ki/ta/i) | Action.LISTEN |
| NOUN(rokuga) | Action.RECORD |
| NOUN(kidou) | Action.LAUNCH |
| ... | |

FIG. 5

| Tense or Action Type | High Priority Category |
|---|---|
| Tense.Past | REC_TITLE |
| Tense.Current | TV_PROGRAM, REC_TITLE |
| Tense.Future | TV_PROGRAM |
| ⋮ | ⋮ |
| Action.PLAY | TV_PROGRAM, REC_TITLE |
| Action.LAUNCH | APPLICATIONS |
| Action.RECORD | TV_PROGRAM |
| ⋮ | ⋮ |
| no tense and no action | TV_PROGRAM, REC_TITLE |

A: Tense.Past through Tense.Future rows
B: Action.PLAY through Action.RECORD rows
C: no tense and no action row

| Keyword | Additional Value |
|---|---|
| CLASS(UNIZUE_NOUN) | 1 |
| CLASS(NUM_NOUN) | 0.7 |
| CLASS(OTHER_NOUN) | 0.5 |
| CLASS(VERB) | -0.5 |
| CLASS(OTHER_WORD_CLASS) | -0.5 |
| WORD(yesterday) | -0.2 |
| WORD(tomorrow) | -0.2 |
| WORD(day) | -0.2 |
| WORD(week) | -0.2 |
| WORD(watch) | -0.5 |
| WORD(tune) | -0.5 |
| WORD(change) | -0.5 |
| WORD(jump) | -0.5 |
| WORD(record) | -0.5 |
| WORD(launch) | -0.5 |
| WORD(channel) | -0.5 |
| WORD(listen) | -0.5 |
| WORD(I) | -1 |
| WORD(want) | -1 |
| WORD(mister) | -1 |
| WORD(missus) | -1 |
| WORD(Please) | -1 |
| ... | ... |

B:

| Keyword | Additional Value |
|---|---|
| CLASS(UNIZUE_NOUN) | 1 |
| CLASS(NUM_NOUN) | 0.7 |
| CLASS(OTHER_NOUN) | 0.5 |
| CLASS(TENSE_NOUN) | 0.3 |
| CLASS(VERB) | -0.5 |
| CLASS(OTHER_WORD_CLASS) | -0.5 |
| WORD(mi) | -0.5 |
| WORD(ki) | -0.5 |
| WORD(ki) | -0.5 |
| WORD(rokuga) | -0.5 |
| WORD(kidou) | -0.5 |
| WORD(ch) | -0.5 |
| WORD(chan) | -0.5 |
| WORD(chan) | -0.5 |
| WORD(channeru) | -0.5 |
| WORD(eiga) | -0.5 |
| WORD(dorama) | -0.5 |
| ... | ... |

| Keyword | Type |
|---|---|
| last week | Tense.Past |
| last/week | Tense.Past |
| the day before yesterday | Tense.Past |
| the/day/before/yesterday | Tense.Past |
| yesterday | Tense.Past |
| today | Tense.Current |
| the day after tomorrow | Tense.Future |
| the/day/after/tomorrow | Tense.Future |
| tomorrow | Tense.Future |
| next week | Tense.Future |
| next/week | Tense.Future |
| coming week | Tense.Future |
| coming/week | Tense.Future |
| ... | ... |

B

| Keyword | Type |
|---|---|
| kyou | Tense.Current |
| ashita | Tense.Future |
| myougonichi | Tense.Future |
| asatte | Tense.Future |
| myoumyougonichi | Tense.Future |
| shiasatte | Tense.Future |
| raishuu | Tense.Future |
| kinou | Tense.Past |
| issakujitsu | Tense.Past |
| ototoi | Tense.Past |
| sakiototoi | Tense.Past |
| sakiototoi | Tense.Past |
| senshuu | Tense.Past |
| ... | ... |

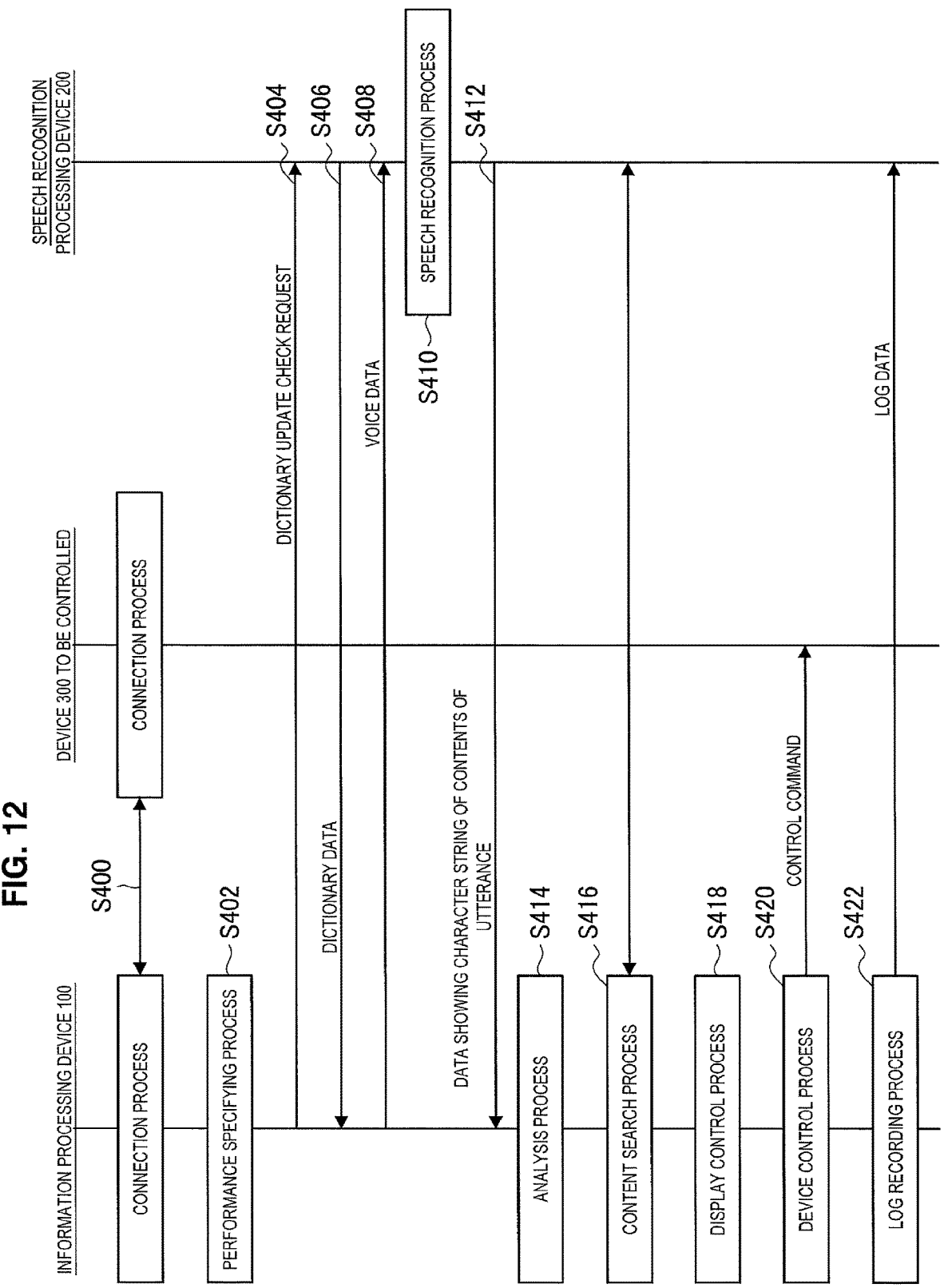

INFORMATION PROCESSING DEVICE, INFORMATION PROCESSING METHOD, AND PROGRAM

CROSS REFERENCE TO RELATED APPLICATIONS

This application is a continuation of U.S. application Ser. No. 17/386,260, filed on Jul. 27, 2021, which is a continuation of U.S. application Ser. No. 16/523,675, filed on Jul. 26, 2019, which is a continuation of U.S. application Ser. No. 14/648,890, filed on Jun. 1, 2015, and is based upon and claims the benefit of priority to International Application No. PCT/JP2013/081312, filed on Nov. 20, 2013 and from the prior Japanese Patent Application No. 2012-287357 filed on Dec. 28, 2012. The entire contents of each of these applications are incorporated herein by reference.

TECHNICAL FIELD

The present disclosure relates to an information processing device, an information processing method, and a program.

BACKGROUND ART

A device capable of recognizing voice to perform a process has been 15 produced. A technology using voice input has been also developed. As a technology using both voice input and another input, there is, for example, a technology described in Patent Literature 1 below.

CITATION LIST

Patent Literature

Patent Literature 1: JP 2001-166914A

SUMMARY OF INVENTION

Technical Problem

For example, in a preexisting device capable of recognizing voice to perform a process (hereinafter, also referred to merely as "preexisting device"), such as a case of using the technology described in Patent Literature 1, a user cannot know which part of contents of utterance is recognized to be used for performing a process. Therefore, in a case in which the preexisting device is used, there is a possibility that a situation that may reduce usability for a user happens, such as a situation in which "a behavior performed in the device in response to voice utterance is not satisfactorily transmitted to a user".

The present disclosure proposes an information processing device, an information processing method, and a program, each of which is new, improved, and capable of improving usability for a user.

Solution to Problem

According to the present disclosure, there is provided an information processing device including an analysis unit configured to analyze a character string indicating contents of utterance obtained as a result of speech recognition, and a display control unit configured to display the character string indicating the contents of the utterance and an analysis result on a display screen.

According to the present disclosure, there is provided an information processing method including a step of analyzing a character string indicating contents of utterance obtained as a result of speech recognition, and a step of displaying the character string indicating the contents of the utterance and an analysis result on a display screen.

According to the present disclosure, there is provided a program for causing a computer to execute a step of analyzing a character string indicating contents of utterance obtained as a result of speech recognition, and a step of displaying the character string indicating the contents of the utterance and an analysis result on a display screen.

Advantageous Effects of Invention

According to the present disclosure, it is possible to improve usability for a user.

BRIEF DESCRIPTION OF DRAWINGS

FIG. 4 is an explanatory diagram illustrating examples of a dictionary for action analysis according to the embodiment.

FIG. 5 is an explanatory diagram illustrating examples of analysis results according to the embodiment and corresponding applications and services.

FIG. 7 is an explanatory diagram illustrating examples of a dictionary for score adjustment according to the embodiment.

FIG. 8 is an explanatory diagram illustrating examples of a dictionary for tense analysis according to the embodiment.

FIG. 12 is an explanatory diagram illustrating an example of a process in the information processing system according to the embodiment.

DESCRIPTION OF EMBODIMENTS

Figure 1:
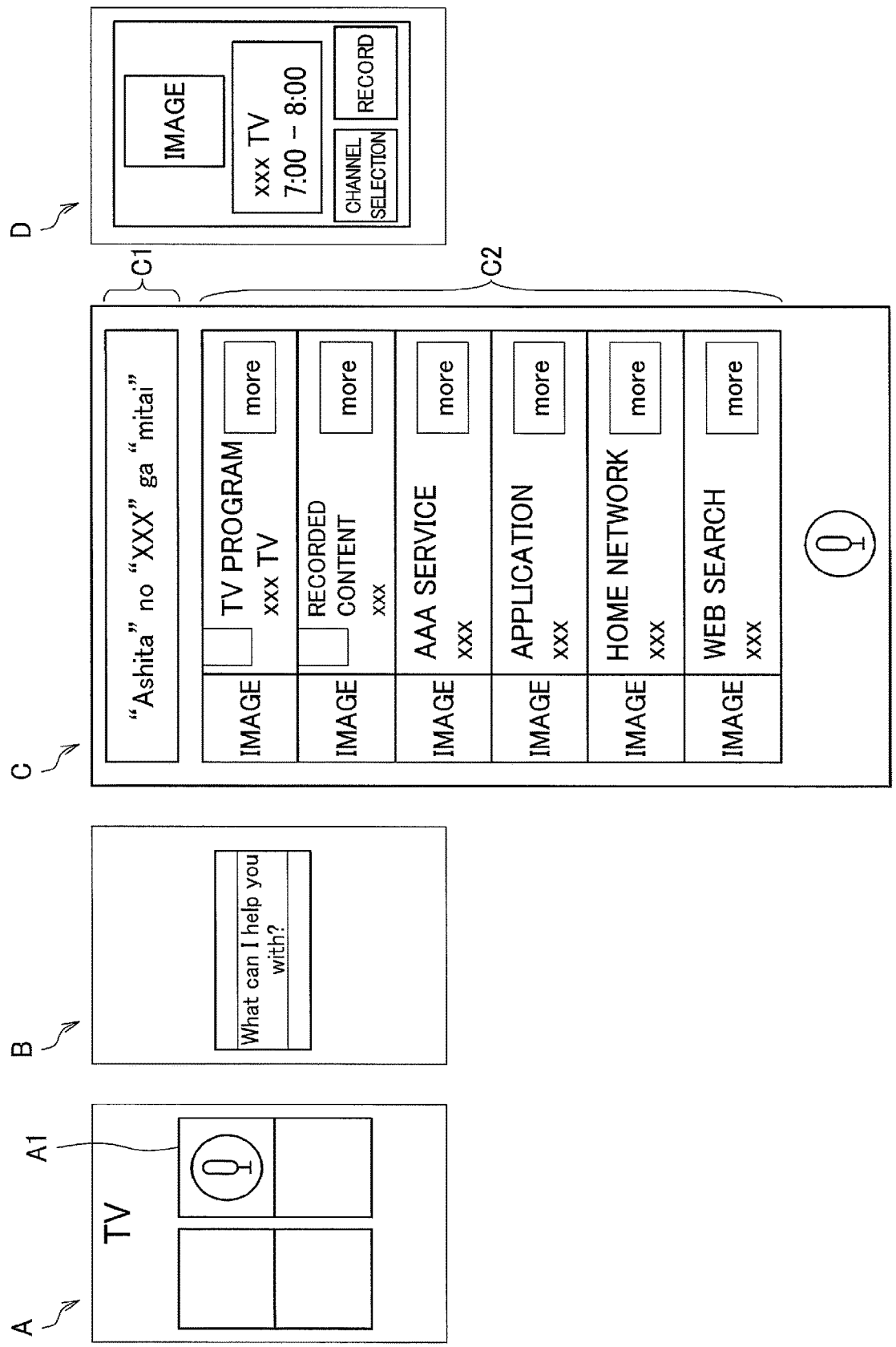
FIG. 1 is an explanatory diagram illustrating outline of a process related to an information processing method according to the embodiment.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Hereinafter, the description will be made in the following order.
1. Information processing method according to embodiment
2. Information processing device according to embodiment
3. Information processing system according to embodiment
4. Program according to embodiment (Information Processing Method According to Embodiment)

Before the configuration of an information processing device according to an embodiment is described, an information processing method according to the embodiment will be first described. Hereinafter, the information processing method according to the embodiment will be described exemplifying a case in which the information processing device according to the embodiment performs a process related to the information processing method according to the embodiment.

[1] Outline of Information Processing Method According to Embodiment

As described above, in a case in which a preexisting device is used, a user cannot know which part of contents of utterance is recognized to be used for performing a process. Therefore, in a case in which the preexisting device is used, there is a possibility that a situation that may reduce usability for a user happens, such as a situation in which "a behavior performed in the device in response to voice utterance is not satisfactorily transmitted to a user".

In view of this, the information processing device according to the embodiment analyzes a character string of contents of utterance obtained as a result of speech recognition (hereinafter, also referred to merely as "character string of contents of utterance") (analysis process). Then, the information processing device according to the embodiment displays the character string of the contents of the utterance and an analysis result on a display screen (display control process).

Here, the information processing device according to the embodiment performs a process related to speech recognition on, for example, voice data showing contents of utterance, thereby obtaining a character string of the contents of the utterance to be processed. However, a method of acquiring the character string of the contents of the utterance to be processed according to the embodiment is not limited to the foregoing example. For example, the information processing device according to the embodiment may acquire, from an external device such as a server, data showing the character string of the contents of the utterance obtained as a result of a process related to speech recognition in the external device, thereby obtaining the character string of the contents of the utterance to be processed.

Examples of the process related to the speech recognition according to the embodiment include a process using a statistical method and a process using the hidden Markov model. However, the process related to the speech recognition according to the embodiment is not limited to the foregoing examples. For example, the information processing device according to the embodiment or an external device such as a server can use an arbitrary process through which the character string of the contents of the utterance can be obtained from the voice data showing the contents of the utterance.

An example of the display screen that is caused to display the character string of the contents of the utterance and the analysis result by the information processing device according to the embodiment includes a display unit (described below) included in own device (information processing device according to the embodiment). However, the display screen that is caused to display the character string of the contents of the utterance and the analysis result by the information processing device according to the embodiment is not limited to the foregoing example. For example, the information processing device according to the embodiment may display the character string of the contents of the utterance and the analysis result on a display screen of a display device included in an external device connected via a wired or wireless network.

Because the information processing device according to the embodiment displays the character string of the contents of the utterance obtained as a result of the speech recognition on the display screen, a user who has performed the utterance can visually grasp how the utterance has been subjected to the speech recognition.

Because the information processing device according to the embodiment displays the analysis result of the character string of the contents of the utterance together with the character string of the contents of the utterance, a user who has performed the utterance can visually grasp how the utterance has been analyzed. Therefore, a user who has performed the utterance can grasp which part of the contents of the utterance has been recognized to be used for a process that is performed in a device (for example, the information processing device according to the embodiment or a device whose action is controlled by the information processing device according to the embodiment) in response to the utterance.

The information processing device according to the embodiment performs (1) analysis process and (2) display control process as a process related to the information processing method according to the embodiment, and therefore it is possible to improve usability of a user.

FIG. 1 is an explanatory diagram illustrating outline of the process related to the information processing method according to the embodiment and illustrates an example of a screen displayed on the display screen by the information processing device according to the embodiment.

A of FIG. 1 illustrates an example of a selection screen of an application for a television receiver, and A1 of FIG. 1 indicates an example of an icon for selecting an application that a user uses to perform speech recognition.

In a case in which the icon indicated by A1 of FIG. 1 is selected on the screen illustrated in A of FIG. 1 by, for example, user operation, an execution screen of the application that a user uses to perform the speech recognition is displayed as illustrated in, for example, B of FIG. 1.

In a case in which a user performs utterance with respect to a voice input device such as a microphone on the screen illustrated in B of FIG. 1, the information processing device according to the embodiment performs the process (1) (analysis process) related to the information processing method according to the embodiment on the basis of data showing a character string of contents of the utterance. Then, the information processing device according to the embodiment performs the process (2) (display control process) related to the information processing method according to the embodiment and therefore displays a screen on which both the character string of the contents of the utterance and an analysis result are displayed as illustrated in, for example, C of FIG. 1.

Here, C of FIG. 1 illustrates an example of the screen displayed in a case in which a user utters "Ashita no XXX ga mitai" (I want to watch tomorrow's XXX). As illustrated in C1 in FIG. 1, the information processing device according to the embodiment, for example, displays a character string indicating contents of utterance "Ashita no XXX ga mitai" (I want to watch tomorrow's XXX) and further displays an analysis result.

C of FIG. 1 illustrates an example where the information processing device according to the embodiment emphasizes the analysis result of the character string indicating the contents of the utterance with the use of quotation marks. However, a method of displaying the analysis result according to the embodiment is not limited to the foregoing example. For example, the information processing device according to the embodiment may display the analysis result of the character string indicating the contents of the utterance so that the analysis result is emphasized with an arbitrary method that is capable of visually changing characters, such as underlining the characters or changing color or a font of the characters.

The information processing device according to the embodiment may perform the process (2) (display control process) related to the information processing method according to the embodiment as illustrated in, for example, C2 in C of FIG. 1, thereby displaying an application corresponding to the contents of the utterance and/or a service corresponding to the contents of the utterance on the display screen.

Here, examples of the application corresponding to the contents of the utterance according to the embodiment include various applications such as an application for displaying a program table of television broadcasting, an application related to viewing of television broadcasting, an application for displaying a list of recorded content, an application related to playback of content recorded on a recording medium, and an application for establishing connection to a network such as a home network. Examples of the service corresponding to the contents of the utterance according to the embodiment include various services such as a video service, a music service, a service provided by an image posting website, and a search service provided by a search site or the like.

In a case in which, for example, "TV program" illustrated in C2 in C of FIG. 1 is selected, a screen corresponding to a selected application or a selected service is displayed as illustrated in, for example, D of FIG. 1.

The information processing device according to the embodiment displays the character string indicating the contents of the utterance and the analysis result on the display screen as illustrated in, for example, C1 in C of FIG. 1. Therefore, for example, a user who looks at the screen illustrated in C of FIG. 1 can visually grasp how the utterance has been subjected to speech recognition on the basis of the character string indicating the contents of the utterance and can also visually grasp how the utterance has been analyzed because the analysis result is displayed to be emphasized with the use of quotation marks or the like.

Therefore, the information processing device according to the embodiment can improve usability for a user. It is needless to say that the screen that is displayed, through the process related to the information processing method according to the embodiment, by the information processing device according to the embodiment is not limited to the example illustrated in C of FIG. 1 and the screen displayed by the information processing device according to the embodiment is not limited to the examples illustrated in A of FIG. 1, B of FIG. 1, and D of FIG. 1.

[2] Example of Process Related to Information Processing Method According to Embodiment Next, the process related to the information processing method according to the embodiment in the information processing device according to the embodiment will be described more specifically. As described above, the information processing device according to the embodiment performs, for example, the process (1) (analysis process) and the process (2) (display control process) as the process related to the information processing method according to the embodiment.

(1) Analysis Process

The information processing device according to the embodiment analyzes a character string indicating contents of utterance obtained as a result of speech recognition.

The information processing device according to the embodiment performs, for example, morphological analysis with the use of a dictionary for syntactic analysis stored in a storage unit (described below) or an external recording medium to divide the character string indicating the contents of the utterance into words such as a noun and a verb. Here, the dictionary according to the embodiment may be, for example, a database format data or may be table format data.

The information processing device according to the embodiment may further perform, for example, semantic analysis (or intention analysis) on the character string indicating the contents of the utterance with the use of a dictionary for semantic analysis stored in the storage unit (described below) or an external recording medium.

Note that the process (1) (analysis process) according to the embodiment is not limited to the foregoing examples.

For example, the information processing device according to the embodiment may set a score with respect to the character string indicating the contents of the utterance on the basis of a result of the syntactic analysis of the character string indicating the contents of the utterance or on the basis of the result of the syntactic analysis and a result of the semantic analysis of the character string indicating the contents of the utterance.

Here, the information processing device according to the embodiment sets a score with respect to each word divided by, for example, the morphological analysis. More specifically, for example, the information processing device according to the embodiment sets a reference score with respect to each divided word and adjusts the score set with respect to each divided word, thereby setting a score corresponding to each divided word. An example of a process related to setting of a score according to the embodiment will be described below.

The score set in the process (1) (analysis process) is used in, for example, an execution process according to the embodiment to be described below. The example of the process related to the setting of the score according to the embodiment and an example of a process in which the set score is used will be described below.

The information processing device according to the embodiment may perform, for example, action analysis on the character string indicating the contents of the utterance. The information processing device according to the embodiment performs the action analysis on the character string indicating the contents of the utterance by, for example, determining, with the use of a dictionary for action analysis stored in the storage unit (described below) or an external recording medium, whether or not a word indicating an action registered in the dictionary for action analysis is included in words divided by the morphological analysis or the like.

A result of the action analysis in the process (1) (analysis process) is used in, for example, the process (2) (display control process). An example of a process in which the result of the action analysis is used in the process (2) (display control process) will be described below.

The information processing device according to the embodiment may perform, for example, tense analysis on the character string indicating the contents of the utterance. The information processing device according to the embodiment performs the tense analysis on the character string indicating the contents of the utterance by determining, for example, with the use of a dictionary for tense analysis stored in the storage unit (described below) or an external recording medium, whether or not a word indicating tense registered in the dictionary for tense analysis is included in the words divided by the morphological analysis or the like.

A result of the tense analysis in the process (1) (analysis process) is used in, for example, the execution process according to the embodiment to be described below. An example of a process in which the result of the tense analysis is used in the execution process according to the embodiment to be described below will be described below.

In the words divided by the morphological analysis or the like, fluctuation of speech recognition exists in some cases. The fluctuation of the speech recognition according to the embodiment indicates that, for example, "a word that should be expressed by a particular Chinese character (Kanji) is expressed by Japanese syllabary (Hiragana)" and "in a case in which an abbreviated name of a word is uttered instead of an official name thereof, a divided word becomes the abbreviated name". In a case in which the fluctuation of the speech recognition described above occurs, there is a possibility that, for example, in the execution process according to the embodiment to be described below, the process cannot be normally performed or a process result desired by a user cannot be obtained.

In view of this, the information processing device according to the embodiment may correct the fluctuation of the speech recognition in order to prevent, for example, the foregoing situation in which the process cannot be normally performed. The information processing device according to the embodiment corrects the fluctuation of the speech recognition by, for example, replacing a word divided by the morphological analysis or the like with the use of a dictionary for fluctuation absorption stored in the storage unit (described below) or an external recording medium.

In a case in which the information processing device according to the embodiment corrects the fluctuation of the speech recognition in the process (1) (analysis process), the character string indicating the contents of the utterance in which the fluctuation of the speech recognition has been corrected is displayed on the screen that is displayed in the process (2) (display control process).

The information processing device according to the embodiment performs, for example, one or two or more processes among the foregoing processes as the analysis process according to the embodiment. It is needless to say that the analysis process according to the embodiment is not limited to the examples of the processes described above.

(2) Display Control Process

The information processing device according to the embodiment displays the character string indicating the contents of the utterance and the analysis result in the process (1) (analysis process) on the display screen. Here, the information processing device according to the embodiment displays the character string indicating the contents of the utterance and the analysis result so as to emphasize the analysis result as illustrated in, for example, C1 in C of FIG. 1.

For example, the information processing device according to the embodiment may display the character string indicating the contents of the utterance on the display screen so that the character string is editable. In the information processing device according to the embodiment, for example, it is possible to edit the entire character string indicating the contents of the utterance or each word, divided by the morphological analysis or the like, in the character string indicating the contents of the utterance.

Here, the information processing device according to the embodiment allows a user to edit the character string indicating the contents of the utterance through, for example, input operation with the use of an input device such as a keyboard or a virtual input device such as a software keyboard. Note that a method of editing the character string indicating the contents of the utterance according to the embodiment is not limited to the foregoing example. For example, the information processing device according to the embodiment allows a user to edit the character string indicating the contents of the utterance through the user's utterance.

In a case in which, for example, the process related to the speech recognition is performed, an error may exist in a result of the speech recognition due to misrecognition. In a preexisting device, the process is performed without doing anything on the basis of a misrecognized result and the process therefore needs to be retried, and, at the time of retry, a user needs to perform utterance again. Further, as described above, in a case in which the preexisting device is used, a user cannot know which part of the contents of the utterance is recognized to be used for performing the process. Furthermore, even if the utterance is performed again in the preexisting device, misrecognition may occur again and therefore a situation that may reduce usability for a user may occur, such as a situation in which a user needs to perform utterance many times to achieve an action desired by the user.

On the contrary, the information processing device according to the embodiment displays the character string indicating the contents of the utterance on the display screen as described above, and therefore a user who has performed the utterance can visually grasp misrecognition of the speech recognition. The information processing device according to the embodiment displays the character string indicating the contents of the utterance on the display screen so that the character string is editable, and therefore, even if an error exists in the character string of the contents of the utterance obtained as a result of the speech recognition, the user can correct the error and can cause the information processing device according to the embodiment (or external device) to perform, for example, the execution process to be described below.

Thus, by displaying the character string indicating the contents of the utterance so that the character string is editable, for example, the information processing device according to the embodiment can encourage the user to correct the contents of the utterance and can cause own device (information processing device according to the embodiment) or an external device to perform the process more accurately. Further, by displaying the character string indicating the contents of the utterance so that the character string is editable, for example, a situation in which the user needs to perform utterance many times to achieve an action desired by the user is prevented, and therefore, usability for the user is improved.

The information processing device according to the embodiment may further display an application corresponding to the contents of the utterance and/or a service corresponding to the contents of the utterance on the display screen on the basis of the analysis result in the process (1) (analysis process) as illustrated in, for example, C2 in C of FIG. 1.

Here, the information processing device according to the embodiment determines, for example, candidates of applications to be displayed on the display screen and/or candidates of services to be displayed on the display screen on the basis of performance information. Then, for example, the information processing device according to the embodiment selects an application and/or service corresponding to the analysis result in the process (1) (analysis process) from the determined candidates of the applications and/or the determined candidates of the services and displays the selected application and/or service on the display screen.

An example of the performance information according to the embodiment includes data showing performance that a device has (for example, data showing a function that the device has and data showing performance of each function). Here, an example of the performance information that the information processing device according to the embodiment uses in the process includes performance information of own device (information processing device according to the embodiment) or an external device whose function is controlled by the information processing device according to the embodiment. Hereinafter, a device corresponding to performance information that the information processing device according to the embodiment uses in the process, i.e., a device whose function is controlled by the information processing device according to the embodiment is also referred to as "device to be controlled".

The information processing device according to the embodiment may, for example, determine the candidates of the applications to be displayed on the display screen and/or the candidates of the services to be displayed on the display screen among a list of the applications and/or services corresponding to the analysis result in the process (1) (analysis process) on the basis of the performance information. In the foregoing case, the information processing device according to the embodiment displays the determined candidates of the applications and/or the determined candidates of the services on the display screen.

In a case in which the application corresponding to the contents of the utterance and/or the service corresponding to the contents of the utterance are/is displayed as illustrated in, for example, C2 in C of FIG. 1, the information processing device according to the embodiment may display the application and/or the service so that the application and/or the service are/is emphasized.

Here, as a method of emphasizing the application and/or service according to the embodiment, for example, display order of the application and the service is adjusted so that an application and/or service to be emphasized are placed higher in the list of the application and service illustrated in C2 in C of FIG. 1. Note that the method of emphasizing the application and/or service according to the embodiment is not limited to the foregoing example. For example, the information processing device according to the embodiment may display the application and/or service so that the application and/or service are/is emphasized with an arbitrary method that is capable of visually changing the application and/or service. The arbitrary method is, for example, providing an icon (for example, microphone icon) indicating that the application and/or service are/is an application and/or service related to the analysis result of the contents of the utterance, providing an icon indicating that the application and/or the service are/is recommended, or changing color or a font of characters.

For example, in a case in which the action analysis is performed on the character string indicating the contents of the utterance in the process (1) (analysis process), the information processing device according to the embodiment emphasizes an application and/or service on the display screen on the basis of a result of the action analysis included in the analysis result.

More specifically, in a case in which the result of the action analysis performed on the character string indicating the contents of the utterance indicates a watching action such as "want to watch", the information processing device according to the embodiment emphasizes applications and services related to viewing, such as an application for displaying a program table of television broadcasting, an application related to viewing of television broadcasting, an application for displaying a list of recorded content, an application related to playback of content stored in a recording medium, a video service, and a service provided by an image posting website. In a case in which the result of the action analysis performed on the character string indicating the contents of the utterance indicates a listening action such as "want to listen", the information processing device according to the embodiment emphasizes applications and services related to playback of voice (including music), such as an application related to playback of content stored in a recording medium and a music service.

In a case in which the result of the action analysis performed on the character string indicating the contents of the utterance indicates no particular action, the information processing device according to the embodiment may emphasize, for example, a set application or service such as a search service provided by a search site or the like.

The information processing device according to the embodiment emphasizes the application and/or service displayed on the display screen, for example, as described above.

Note that the process related to emphasizing of the application and/or the service according to the embodiment is not limited to the foregoing example. For example, in a case in which a priority degree is set with respect to each application and service according to the embodiment, the information processing device according to the embodiment may display an application and/or service having a higher priority degree so that the application and/or service are/is emphasized more clearly among the emphasized application and service.

The information processing device according to the embodiment performs, for example, the foregoing process as the display control process according to the embodiment. It is needless to say that the display control process according to the embodiment is not limited to the example of the process described above.

The information processing device according to the embodiment performs, for example, the process (1) (analysis process) and the process (2) (display control process) described above as the process related to the information processing method according to the embodiment.

Note that the process related to the information processing method according to the embodiment is not limited to the process (1) (analysis process) and the process (2) (display control process).

For example, the information processing device according to the embodiment may execute a process related to an application corresponding to the contents of the utterance or a service corresponding to the contents of the utterance selected on a screen, such as the screen illustrated in C of FIG. 1, on which the application corresponding to the contents of the utterance and the service corresponding to the contents of the utterance are displayed (execution process).

More specifically, the information processing device according to the embodiment performs, for example, a process (a), a process (b), or a process (c) to be described below as the execution process according to the embodiment. Note that specific examples of the execution process according to the embodiment will be described below.

(a) First Example of Execution Process According to Embodiment

In a case in which, for example, the setting of the score is performed on the character string indicating the contents of the utterance in the process (1) (analysis process), the information processing device according to the embodiment determines, on the basis of a result of comparison between a set reference value and the set score, a part or all of the character string indicating the contents of the utterance as a character string for use in execution of the application corresponding to the contents of the utterance or execution of the process related to the service corresponding to the contents of the utterance. Then, the information processing device according to the embodiment executes the application corresponding to the contents of the utterance or the process related to the service corresponding to the contents of the utterance with the use of the determined character string.

Here, the reference value according to the embodiment may be, for example, a fixed value that has been set in advance or may be a variable value that can be changed based on user operation or the like.

More specifically, for example, in a case in which a score larger than the reference value (or a score equal to or larger than the reference value; the same applies to the following description) does not exist in the character string indicating the contents of the utterance, the information processing device according to the embodiment uses the entire character string indicating the contents of the utterance in the process. Meanwhile, for example, in a case in which a score larger than the reference value exists in the character string indicating the contents of the utterance, the information processing device according to the embodiment uses, in the process, one or two or more parts of the character string having a large score/large scores among the character string indicating the contents of the utterance.

(b) Second Example of Execution Process According to Embodiment

For example, in a case in which the tense analysis is performed on the character string indicating the contents of the utterance in the process (1) (analysis process), the information processing device according to the embodiment selectively uses, in the process, wording indicating tense included in the character string indicating the contents of the utterance on the basis of a result of the tense analysis. More specifically, in a case in which the result of the tense analysis indicates that wording indicating tense is included in the character string indicating the contents of the utterance in the foregoing case, the information processing device according to the embodiment uses, in the process, the wording indicating the tense included in the character string indicating the contents of the utterance.

(c) Third Example of Execution Process According to Embodiment

The information processing device according to the embodiment can also perform, for example, a process in which the process according to the first example is combined with the process according to the second example.

The information processing device according to the embodiment performs, for example, the process (a), the process (b), or the process (c) described above as the execution process according to the embodiment.

The process related to the information processing method according to the embodiment is not limited to "the process (1) (analysis process) and the process (2) (display control process)" and "the process (1) (analysis process), the process (2) (display control process), and the execution process".

The information processing device according to the embodiment may record, for example, the analysis result in the process (1) (analysis process) as a log (log recording control process).

Here, examples of a target on which the information processing device according to the embodiment records the log include the storage unit (described below), an external recording medium connected to the information processing device according to the embodiment, and an external device communicable via a network (or directly). Examples of the network according to the embodiment include a wired network such as a local area network (LAN) or a wide area network (WAN), a wireless network such as a wireless local area network (WLAN) or a wireless wide area network (WWAN) via a base station, and the Internet using a communication protocol such as Transmission Control Protocol/Internet Protocol (TCP/IP).

Because the information processing device according to the embodiment records the analysis result as the log, a device for performing a process related to speech recognition (for example, information processing device according to the embodiment or external device such as a server) can use the log in order to, for example, improve accuracy of speech recognition or improve a behavior of an application.

[3] Specific Example of Process Related to Information Processing Method According to Embodiment Next, a specific example of the process related to the information processing method according to the embodiment will be described. Hereinafter, the description will be made assuming that the process related to the information processing method according to the embodiment is performed by the information processing device according to the embodiment.

Figure 2:
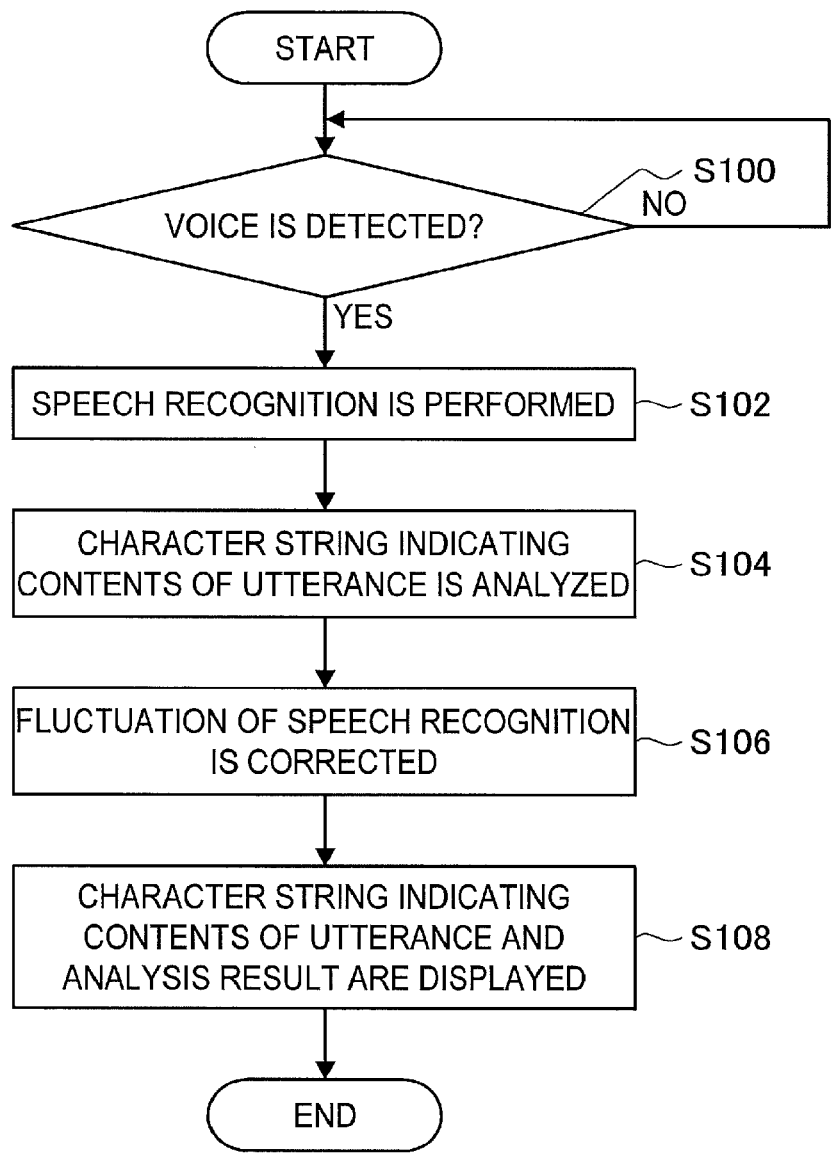
FIG. 2 is a flow chart illustrating a first example of the process related to the information processing method according to the embodiment.

(A) First Example of Process Related to Information Processing Method According to Embodiment FIG. 2 is a flow chart illustrating a first example of the process related to the information processing method according to the embodiment. Here, for example, processes in Steps S104 and S106 illustrated in FIG. 2 correspond to the process (1) (analysis process), and a process in Step S108 illustrated in FIG. 2 corresponds to the process (2) (display control process). FIG. 2 illustrates an example where the information processing device according to the embodiment performs a process related to speech recognition on voice data showing contents of utterance. Note that, as described above, the process related to the speech recognition performed on the voice data showing the contents of the utterance may be performed in an external device such as a server.

The information processing device according to the embodiment determines whether or not voice is detected (S100). For example, in a case in which the information processing device receives voice data showing contents of utterance transmitted from the voice input device such as a microphone, the information processing device according to the embodiment determines that the voice is detected.

In a case in which it is not determined that the voice is detected in Step S100, the information processing device according to the embodiment does not advance a process until it is determined that the voice is detected.

In a case in which it is determined that the voice is detected in Step S100, the information processing device according to the embodiment performs a process related to speech recognition on the voice data (S102). The information processing device according to the embodiment performs, as the process related to the speech recognition, for example, a process using a statistical method or a process using the hidden Markov model.

The information processing device according to the embodiment analyzes a character string indicating the contents of the utterance obtained from the process of Step S102 (S104). Here, the information processing device according to the embodiment performs, for example, the syntactic analysis and the semantic analysis on the character string indicating the contents of the utterance.

When the process of Step S104 is performed, the information processing device according to the embodiment corrects fluctuation of the speech recognition (S106). The information processing device according to the embodiment corrects the fluctuation of the speech recognition by, for example, replacing a word divided by the morphological analysis or the like with the use of the dictionary for fluctuation absorption stored in the storage unit (described below) or the like.

When the process of Step S106 is performed, the information processing device according to the embodiment displays the character string indicating the contents of the utterance and an analysis result in Step S104 on the display screen (S108). The information processing device according to the embodiment displays the analysis result of the character string indicating the contents of the utterance so that the analysis result is emphasized with respect to the character string indicating the contents of the utterance as illustrated in, for example, C1 in C of FIG. 1.

The information processing device according to the embodiment performs the process as illustrated in, for example, FIG. 2 as the process related to the information processing method according to the embodiment. By performing the process illustrated in, for example, FIG. 2, the process (1) (analysis process) and the process (2) (display control process) related to the information processing method according to the embodiment are achieved.

Therefore, by performing the process illustrated in, for example, FIG. 2, the information processing device according to the embodiment can improve usability for a user.

Note that the process related to the information processing method according to the first example of the embodiment is not limited to the example illustrated in FIG. 2.

For example, the information processing device according to the embodiment does not necessarily need to the process of Step S106 in FIG. 2. For example, even in a case in which the process of Step S106 is not performed, the information processing device according to the embodiment can perform the process (1) (analysis process) and the process (2) (display control process) related to the information processing method according to the embodiment. Therefore, even in a case in which, for example, the process of Step S106 is not performed, the information processing device according to the embodiment can improve usability for a user.

(B) Second Example of Process Related to Information Processing Method According to Embodiment The process related to the information processing method according to the embodiment is not limited to the process according to the first example. As illustrated in, for example, C2 in C of FIG. 1, in the process (2) (display control process) according to the embodiment, the information processing device according to the embodiment may further display, for example, an application corresponding to the contents of the utterance and/or a service corresponding to the contents of the utterance on the display screen on the basis of the analysis result in the process (1) (analysis process).

Figure 3:
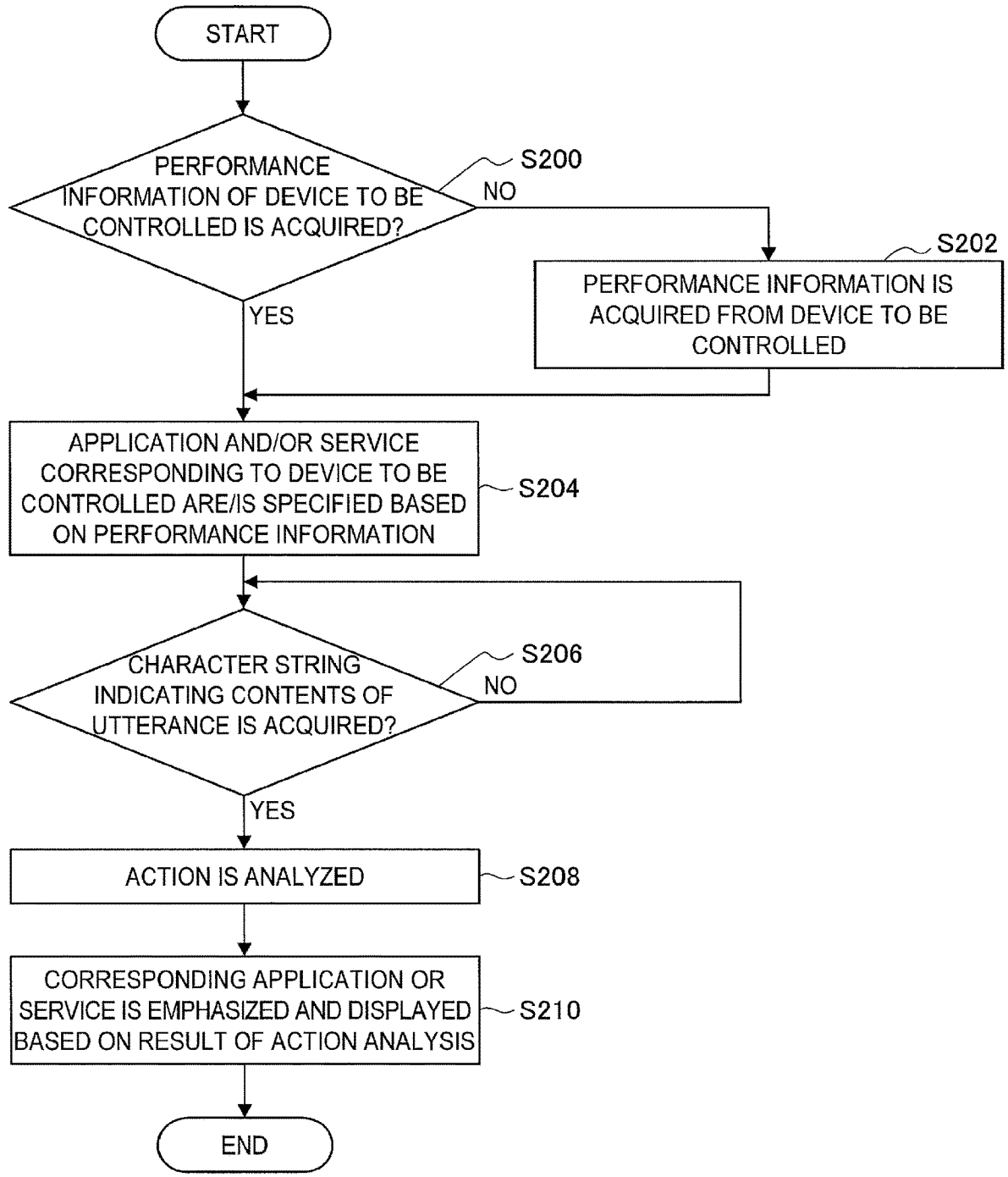
FIG. 3 is a flow chart illustrating a second example of the process related to the information processing method according to the embodiment.

FIG. 3 is a flow chart illustrating a second example of the process related to the information processing method according to the embodiment. FIG. 3 illustrates an example of a process performed in a case in which the information processing device according to the embodiment further displays the application corresponding to the contents of the utterance and/or the service corresponding to the contents of the utterance on the display screen. Here, for example, a process of Step S208 in FIG. 3 corresponds to the process (1) (analysis process), and a process of Step S210 in FIG. 3 corresponds to the process (2) (display control process). For example, the process according to the second example illustrated in FIG. 3 may be performed in parallel with the process according to the first example illustrated in FIG. 2 or may be performed after the process according to the first example illustrated in FIG. 2 is performed.

The information processing device according to the embodiment determines whether or not performance information of a device to be controlled is acquired (S200). In a case in which it is determined that the performance information of the device to be controlled is acquired in Step S200, the information processing device according to the embodiment performs a process of Step S204 to be described below.

In a case in which it is not determined that the performance information of the device to be controlled is acquired in Step S200, the information processing device according to the embodiment acquires the performance information from the device to be controlled (S202). For example, in a case in which the device to be controlled according to the embodiment is own device (information processing device according to the embodiment), the information processing device according to the embodiment generates performance information to acquire the performance information. Meanwhile, for example, in a case in which the device to be controlled according to the embodiment is an external device, the information processing device according to the embodiment transmits a performance information transmission request including a transmission command for instructing transmission of performance information to the external device to acquire the performance information.

In a case in which it is determined that the performance information of the device to be controlled is acquired in Step S200 or in a case in which the performance information of the device to be controlled is acquired through the process of Step S202, the information processing device according to the embodiment specifies an application or service corresponding to the device to be controlled among a list of applications and services on the basis of, for example, the performance information (S204).

The information processing device according to the embodiment determines whether or not a character string indicating contents of utterance is acquired (S206). In a case in which it is not determined that the character string indicating the contents of the utterance is acquired in Step S206, the information processing device according to the embodiment does not advance the process until, for example, it is determined that the character string indicating the contents of the utterance is acquired.

In a case in which it is determined that the character string indicating the contents of the utterance is acquired in Step S206, the information processing device according to the embodiment performs the action analysis on the character string indicating the contents of the utterance (S208). The information processing device according to the embodiment performs the action analysis on the character string indicating the contents of the utterance by determining, for example, with the use of the dictionary for action analysis stored in the storage unit (described below), whether or not a word indicating an action registered in the dictionary for action analysis is included in the words divided by the morphological analysis or the like in the process of Step S104 in FIG. 2.

FIG. 4 is an explanatory diagram illustrating examples of the dictionary for action analysis according to the embodiment. Here, in FIG. 4, words are indicated as "Keyword" and actions are indicated as "Type". A illustrated in FIG. 4 illustrates an example of the dictionary for action analysis in a table format in which English words and actions are associated with each other, and B illustrated in FIG. 4 illustrates an example of the dictionary for action analysis in a table format in which Japanese words and actions are associated with each other. FIG. 4 illustrates the examples in each of which each word in the dictionary for action analysis is associated with information indicating a part of speech.

The information processing device according to the embodiment determines whether or not a word indicating an action registered in the dictionary for action analysis illustrated in FIG. 4 is included in the words divided by, for example, the morphological analysis. In a case in which it is determined that the word is included therein, an action corresponding to the word is specified as an action indicated by the character string indicating the contents of the utterance and therefore the action in the character string indicating the contents of the utterance is analyzed.

It is needless to say that the process related to the action analysis performed on the character string indicating the contents of the utterance according to the embodiment is not limited to the foregoing example and the dictionary for action analysis according to the embodiment is not limited to the examples illustrated in FIG. 4.

Referring back to FIG. 3, the second example of the process related to the information processing method according to the embodiment will be described. When the process of Step S208 is performed, the information processing device according to the embodiment displays a corresponding application or service so that the corresponding application or service is emphasized on the basis of a result of the action analysis in the process of Step S208 (S210).

For example, in a case in which the result of the action analysis performed on the character string indicating the contents of the utterance in Step S208 indicates a watching action such as "want to watch", the information processing device according to the embodiment emphasizes an application and/or service related to viewing, such as an application for displaying a program table of television broadcasting. In a case in which the result of the action analysis performed on the character string indicating the contents of the utterance in Step S208 indicates a listening action such as "want to listen", the information processing device according to the embodiment emphasizes an application and/or service related to playback of voice (including music), such as an application related to playback of content stored in a recording medium. In a case in which the result of the action analysis performed on the character string indicating the contents of the utterance in Step S208 indicates no particular operation, the information processing device according to the embodiment may emphasize a set application or service such as a search service provided by a search site.

For example, an application and a service to be preferentially displayed may be set in the result of the action analysis performed on the character string indicating the contents of the utterance in Step S208.

FIG. 5 is an explanatory diagram illustrating examples of analysis results according to the embodiment and corresponding applications and services. Here, in FIG. 5, the analysis results are indicated as "Tense or Action Type" and the corresponding applications and services are indicated as "High Priority Category". FIG. 5 illustrates examples of a table in which the analysis results and the applications and the services are associated with each other. A illustrated in FIG. 5 illustrates an example of results of the tense analysis and applications and services corresponding to the results of the tense analysis. B of FIG. 5 illustrates an example of results of the action analysis and applications and services corresponding to the results of the action analysis. C illustrated in FIG. 5 illustrates an example of a corresponding application or service displayed in a case in which neither tense nor an action is included in the character string indicating the contents of the utterance as a result of the tense analysis and the action analysis.

By referring to the table illustrated in, for example, FIG. 5, the information processing device according to the embodiment specifies an application and/or service corresponding to the result of the action analysis performed on the character string indicating the contents of the utterance in Step S208. Then, the information processing device according to the embodiment preferentially displays, for example, the specified application and/or service on the display screen.

The information processing device according to the embodiment may perform, as the process related to the information processing method according to the embodiment, for example, the process illustrated in FIG. 3 in parallel with the process according to the first example illustrated in FIG. 2 or may perform the process illustrated in FIG. 3 after the process according to the first example illustrated in FIG. 2 is performed.

Therefore, for example, by performing the process illustrated in FIG. 3, the information processing device according to the embodiment can further display the application corresponding to the contents of the utterance and/or the service corresponding to the contents of the utterance on the display screen on the basis of the analysis result in the process (1) (analysis process) as illustrated in, for example, C2 in C of FIG. 1. It is needless to say that the process related to the information processing method according to the second example of the embodiment is not limited to the example illustrated in FIG. 3.

(C) Third Example of Process Related to Information Processing Method According to Embodiment Note that the process related to the information processing method according to the embodiment is not limited to the process according to the first example or the process according to the second example. For example, the information processing device according to the embodiment can further perform the execution process according to the embodiment described above.

Figure 6:
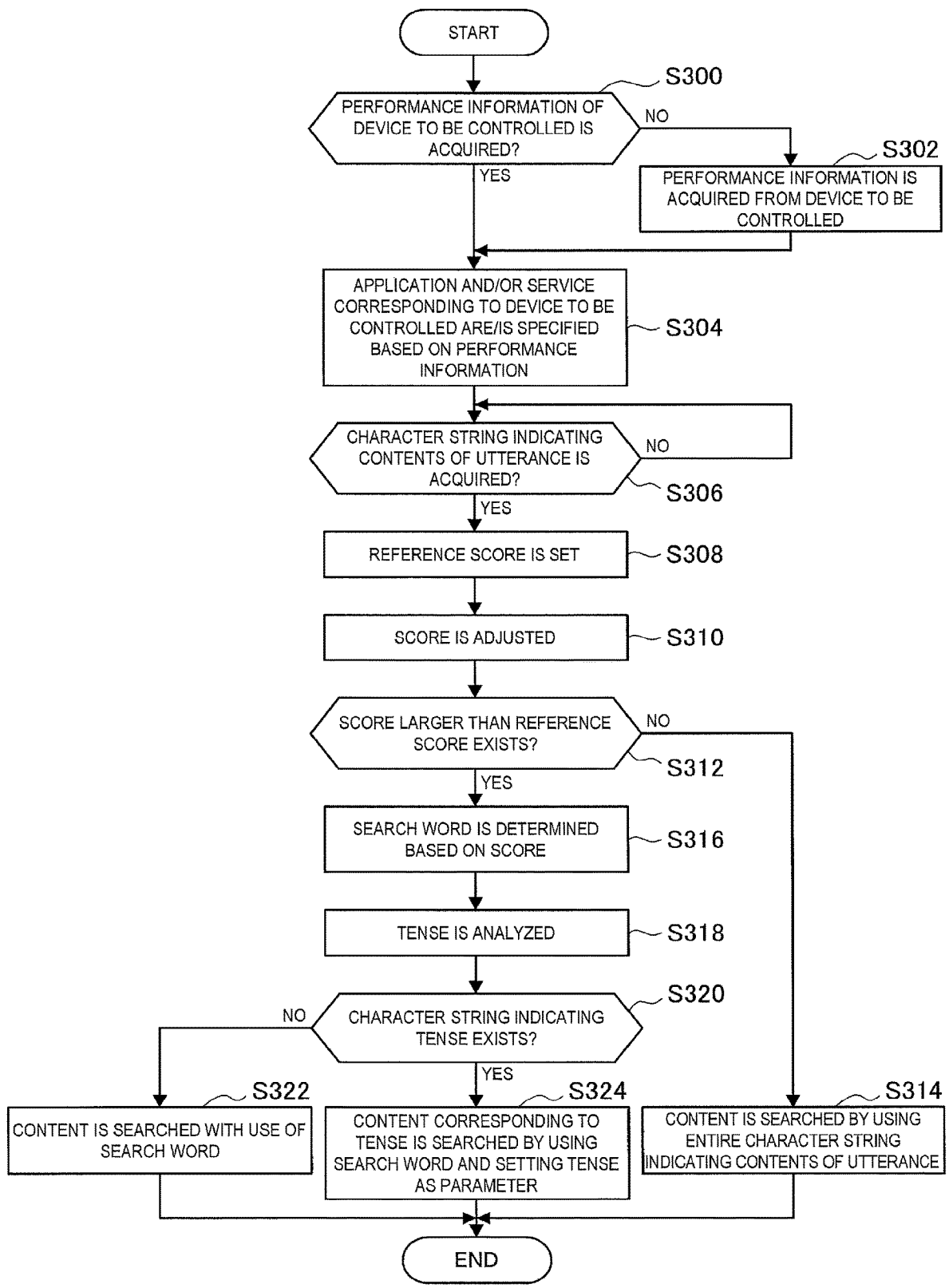
FIG. 6 is a flow chart illustrating a third example of the process related to the information processing method according to the embodiment.

FIG. 6 is a flow chart illustrating a third example of the process related to the information processing method according to the embodiment. FIG. 6 illustrates an example where the information processing device according to the embodiment performs, as the execution process according to the embodiment, a process related to searching content with the use of the character string indicating the contents of the utterance. Examples of the content searched by the information processing device according to the embodiment in FIG. 6 include content data such as image data and voice data stored in a recording medium such as an optical disk or a magnetic disk, a program of television broadcasting, and various kinds of information and data obtained via a search service on the Web.

Here, for example, processes of Steps S308 to S318 in FIG. 6 correspond to the process (1) (analysis process), and processes of Steps S314 and S320 to S324 in FIG. 6 correspond to the execution process. For example, the process according to the third example illustrated in FIG. 6 may be performed in parallel with the process according to the first example illustrated in FIG. 2 or may be performed after the process according to the first example illustrated in FIG. 2 is performed. Alternatively, for example, the process according to the third example illustrated in FIG. 6 may be performed in parallel with the process according to the second example illustrated in FIG. 3.

The information processing device according to the embodiment determines whether or not performance information of a device to be controlled is acquired (S300). In a case in which it is determined that the performance information of the device to be controlled is acquired in Step S300, the information processing device according to the embodiment performs a process of Step S304 to be described below.

In a case in which it is not determined that the performance information of the device to be controlled is acquired in Step S300, the information processing device according to the embodiment acquires the performance information from the device to be controlled in the same way as Step S202 in FIG. 3 (S302).

In a case in which it is determined that the performance information of the device to be controlled is acquired in Step S300 or in a case in which the performance information of the device to be controlled is acquired through the process of Step S302, the information processing device according to the embodiment specifies an application and/or service corresponding to the device to be controlled from a list of applications and services on the basis of the performance information (S304).

The information processing device according to the embodiment determines whether or not a character string indicating contents of utterance is acquired (S306). In a case in which it is not determined that the character string indicating the contents of the utterance is acquired in Step S306, the information processing device according to the embodiment does not advance the process until, for example, it is determined that the character string indicating the contents of the utterance is acquired.

In a case in which it is determined that the character string indicating the contents of the utterance is acquired in Step S306, the information processing device according to the embodiment sets a reference score with respect to the character string indicating the contents of the utterance (S308). Here, the information processing device according to the embodiment sets a reference score "1" with respect to each divided word divided by the morphological analysis or the like in the process of Step S104 in FIG. 2. For example, in a case in which the character string indicating the contents of the utterance (or the character string in which the fluctuation of the speech recognition has been corrected) is "Ashita no XXX ga mitai" (I want to watch tomorrow's XXX) illustrated in C of FIG. 1, the information processing device according to the embodiment sets the reference score "1" with respect to each of the words "Ashita"/"no"/"XXX"/ "ga"/"mi"/"ta"/"i". It is needless to say that the reference score according to the embodiment is not limited to "1".

When the reference score is set in Step S308, the information processing device according to the embodiment adjusts the set reference score (S310). The information processing device according to the embodiment adjusts the set reference score with the use of, for example, the dictionary for score adjustment stored in the storage unit (described below) or an external recording medium.

FIG. 7 is an explanatory diagram illustrating examples of the dictionary for score adjustment according to the embodiment. Here, in FIG. 7, words are indicated as "Keyword" and adjustment values for adjusting scores are indicated as "Additional Value". A illustrated in FIG. 7 illustrates an example of the dictionary for score adjustment in a table format in which English words and adjustment values are associated with each other, and B illustrated in FIG. 7 illustrates an example of the dictionary for score adjustment in a table format in which Japanese words and adjustment values are associated with each other.

The information processing device according to the embodiment specifies an adjustment value corresponding to each word divided by the morphological analysis or the like in the process of Step S104 of FIG. 2 by referring to, for example, the dictionary for score adjustment illustrated in FIG. 7. Then, the information processing device according to the embodiment adjusts the set reference score by, for example, adding the adjustment value corresponding to each specified word to the reference score of the corresponding word.

For example, in a case in which the character string indicating the contents of the utterance (or the character string in which the fluctuation of the speech recognition has been corrected) is "Ashita no XXX ga mitai" (I want to watch tomorrow's XXX) illustrated in C of FIG. 1, the information processing device according to the embodiment adjusts the scores of the respective words "Ashita"/"no"/ "XXX"/"ga"/"mi"/"ta"/"i". An example of adjusted scores is cited below. It is needless to say that the adjusted scores are not limited to the following example.

score of "Ashita": "1.3"
score of "no": "1"
score of "XXX": "2"
score of "ga": "1"
score of "mi": "0.5"
score of "ta": "1"
score of "i": "1"

It is needless to say that a process related to adjustment of the scores that are set with respect to the character string indicating the contents of the utterance according to the embodiment is not limited to the foregoing example and the dictionary for score adjustment according to the embodiment is not limited to the examples illustrated in FIG. 7.

Referring back to FIG. 6, the third example of the process related to the information processing method according to the embodiment will be described. When the process of Step S310 is performed, the information processing device according to the embodiment determines whether or not a score larger than the set reference value exists in the character string indicating the contents of the utterance (S314).

In a case in which it is not determined that the score larger than the set reference value exists in Step S314, the information processing device according to the embodiment searches, for example, content with the use of the entire character string indicating the contents of the utterance (S314).

In a case in which it is determined that the score larger than the set reference value exists in Step S314, the information processing device according to the embodiment determines a search word on the basis of, for example, the set score (S316).

The information processing device according to the embodiment determines, as the search word, for example, a part of the character string having the largest score among the character string indicating the contents of the utterance. For example, in the example of the adjusted scores described above obtained in a case in which the character string indicating the contents of the utterance (or the character string in which the fluctuation of the speech recognition has been corrected) is "Ashita no XXX ga mitai" (I want to watch tomorrow's XXX) illustrated in C of FIG. 1, the score of "XXX" is the largest among the adjusted scores. Therefore, in the foregoing case, the information processing device according to the embodiment determines, for example, "XXX" as the search word. Here, an example of a screen to be displayed on the display screen in a case in which "XXX" is determined as the search word in Step S316 and then processes of and after Step S318 to be described below are performed is the screen illustrated in C of FIG. 1. It is needless to say that the screen to be displayed on the display screen in a case in which "XXX" is determined as the search word in Step S316 and then the processes of and after Step S318 to be described below are performed is not limited to the screen illustrated in C of FIG. 1.

The information processing device according to the embodiment may determine, as the search words, for example, a plurality of parts of the character string having large scores among the character string indicating the contents of the utterance. In a case in which the plurality of parts of the character string are used, the information processing device according to the embodiment searches content by performing, for example, AND search of the plurality of parts of the character string or OR search of the plurality of parts of the character string.

When the process of Step S316 is performed, the information processing device according to the embodiment performs the tense analysis on the character string indicating the contents of the utterance (S318). The information processing device according to the embodiment performs the tense analysis on the character string indicating the contents of the utterance by determining, for example, with the use of the dictionary for tense analysis stored in the storage unit (described below), whether or not a word indicating tense registered in the dictionary for tense analysis is included in the words divided by the morphological analysis or the like.

FIG. 8 is an explanatory diagram illustrating examples of the dictionary for tense analysis according to the embodiment. Here, in FIG. 8, words are indicated as "Keyword" and corresponding tense is indicated as "Type". A illustrated in FIG. 8 illustrates an example of the dictionary for tense analysis in a table format in which English words and corresponding tense are associated with each other, and B illustrated in FIG. 8 illustrates an example of the dictionary for tense analysis in a table format in which Japanese words and corresponding tense are associated with each other.

The information processing device according to the embodiment determines whether or not a word indicating tense registered in the dictionary for tense analysis is included in the words divided by the morphological analysis or the like in the process of step S104 in FIG. 2 by referring to, for example, the dictionary for tense analysis illustrated in FIG. 8. In a case in which a word indicating tense is included in the words divided by the morphological analysis or the like, the information processing device according to the embodiment determines, for example, tense corresponding to the word as tense included in the character string indicating the contents of the utterance. In a case in which the word indicating tense is not included in the words divided by the morphological analysis or the like, the information processing device according to the embodiment determines that, for example, a character string indicating tense is not included in the character string indicating the contents of the utterance.

It is needless to say that the process related to the tense analysis performed on the character string indicating the contents of the utterance according to the embodiment is not limited to the foregoing example and the dictionary for tense analysis according to the embodiment is not limited to the examples illustrated in FIG. 8.

Referring back to FIG. 6, the third example of the process related to the information processing method according to the embodiment will be described. When the process of Step S318 is performed, the information processing device according to the embodiment determines whether or not a character string indicating tense exists in the character string indicating the contents of the utterance (S320). In a case in which, for example, tense included in the character string indicating the contents of the utterance is determined in Step S318, the information processing device according to the embodiment determines that the character string indicating tense exists in the character string indicating the contents of the utterance.

In a case in which it is not determined that the character string indicating tense exists in the character string indicating the contents of the utterance in Step S320, the information processing device according to the embodiment searches content with the use of the search word determined in Step S316 (S322).

In a case in which it is determined that the character string indicating tense exists in the character string indicating the contents of the utterance in Step S320, the information processing device according to the embodiment searches content by setting the tense determined in Step S318 as a parameter with the use of the search word determined in Step S316 (S324).

For example, in a case in which the determined tense is past, the information processing device according to the embodiment searches content data (example of content) such as image data and voice data stored in a recording medium such as an optical disk or a magnetic disk. Meanwhile, for example, in a case in which the determined tense is future, the information processing device according to the embodiment searches a program (example of content) of television broadcasting.

As the process related to the information processing method according to the embodiment, the information processing device according to the embodiment performs, for example, the process illustrated in FIG. 6 in parallel with the process according to the first example illustrated in FIG. 2 or after the process according to the first example illustrated in FIG. 2 is performed, or performs the process illustrated in FIG. 6 further in parallel with the process according to the second example illustrated in FIG. 3.

Therefore, for example, by performing the process illustrated in FIG. 6, the information processing device according to the embodiment can execute a process related to an application corresponding to the contents of the utterance or a service corresponding to the contents of the utterance selected on a screen, such as the screen illustrated in C of FIG. 1, on which the application corresponding to the contents of the utterance and the service corresponding to the contents of the utterance are displayed.

Note that the process related to the information processing method according to the third example of the embodiment is not limited to the example illustrated in FIG. 6. For example, it is possible that the information processing device according to the embodiment does not perform the process related to tense in Steps S318, S312, and S324 in FIG. 6.

The information processing device according to the embodiment performs, as the process related to the information processing method according to the embodiment, for example, the process according to the first example described in (A), the process according to the second example described in (B), and the process according to the third example described in (C). It is needless to say that the process related to the information processing method according to the embodiment is not limited to the foregoing processes.

Information Processing Device According to Embodiment

Next, an example of the configuration of the information processing device according to the embodiment which is capable of performing the processes related to the information processing method according to the embodiment described above will be described.

Figure 9:
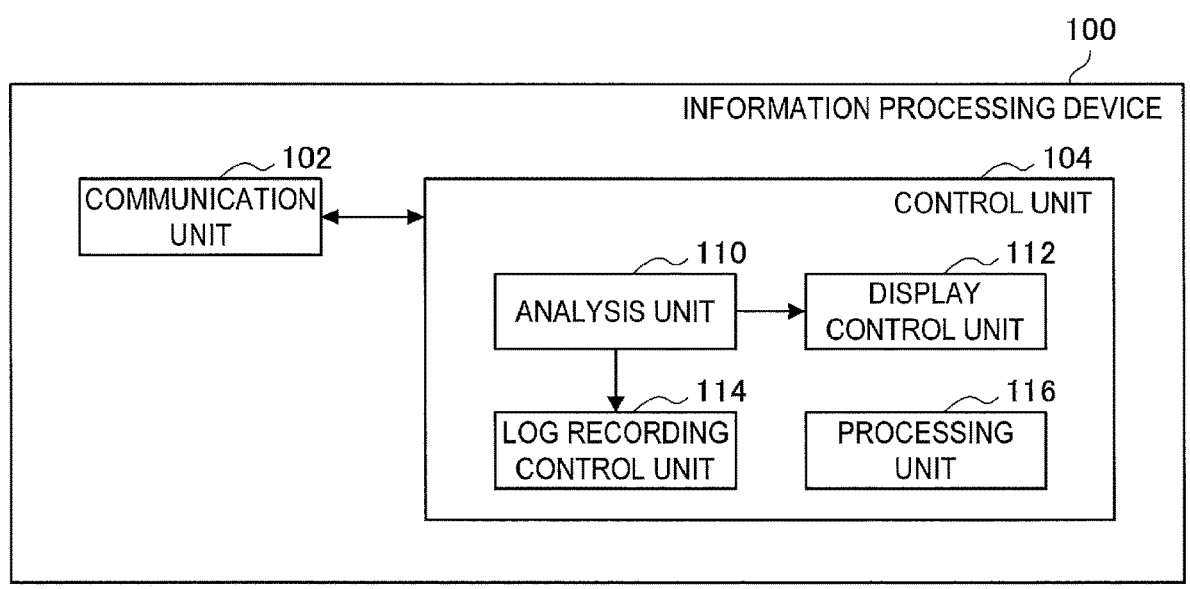
FIG. 9 is a block diagram illustrating an example of the configuration of an information processing device according to the embodiment.

FIG. 9 is a block diagram illustrating an example of the configuration of an information processing device 100 according to the embodiment. The information processing device 100 includes, for example, a communication unit 102 and a control unit 104.

The information processing device 100 may include, for example, a read-only memory (ROM; not illustrated), a random access memory (RAM; not illustrated), a storage unit (not illustrated), an operation unit (not illustrated) which a user can operate, and a display unit (not illustrated) which displays various screens on a display screen. In the information processing device 100, for example, the foregoing constituent elements are connected by a bus serving as a data transmission path.

Here, the ROM (not illustrated) stores a program used by the control unit 104 or control data such as arithmetic parameters. The RAM (not illustrated) temporarily stores a program executed by the control unit 104.

The storage unit (not illustrated) is a storage unit included in the information processing device 100 and stores various kinds of data, such as, various kinds of dictionaries and applications. Here, examples of the storage unit (not illustrated) include a magnetic recording medium such as a hard disk and a non-volatile memory such as a flash memory. The storage unit (not illustrated) may be detachably mounted on the information processing device 100.

An example of the operation unit (not illustrated) includes an operation input device to be described below and an example of the display unit (not illustrated) includes a display device to be described below.

Example of Hardware Configuration of Information Processing Device 100

Figure 10:
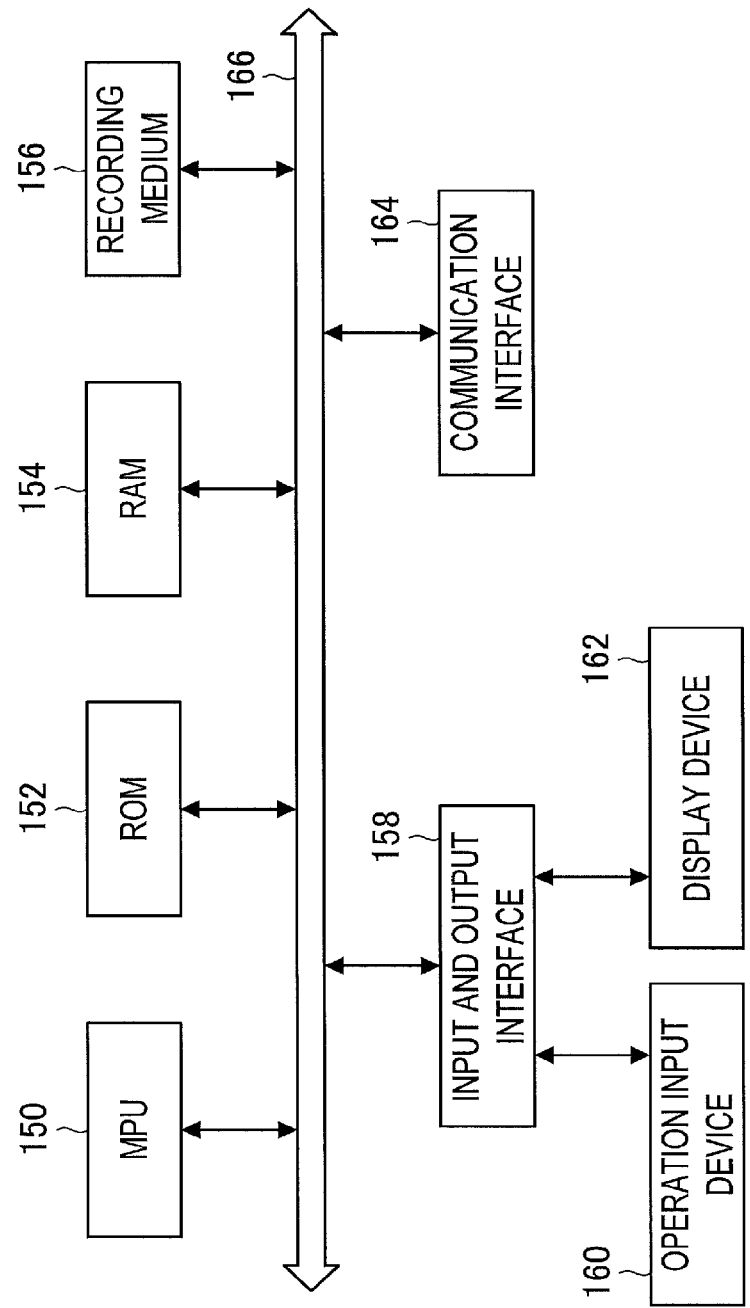
FIG. 10 is an explanatory diagram illustrating an example of a hardware configuration of the information processing device according to the embodiment.

FIG. 10 is an explanatory diagram illustrating an example of a hardware configuration of the information processing device 100 according to the embodiment. The information processing device 100 includes, for example, an MPU 150, a ROM 152, a RAM 154, a recording medium 156, an input and output interface 158, an operation input device 160, a display device 162, and a communication interface 164. In the information processing device 100, for example, the constituent elements are connected by a bus 166 serving as a data transmission path.

The MPU 150 includes, for example, a micro processing unit (MPU) and various processing circuits and functions as the control unit 104 that controls the entire information processing device 100. In the information processing device 100, the MPU 150 serves as, for example, an analysis unit 110, a display control unit 112, a log recording control unit 114, and a processing unit 116 to be described below.

The ROM 152 stores control data such as calculation parameters and a program used by the MPU 150. The RAM 154 temporarily stores, for example, a program executed by the MPU 150.

The recording medium 156 functions as the storage unit (not illustrated) and stores various kinds of data, such as various kinds of dictionaries and applications. Here, examples of the recording medium 156 include a magnetic recording medium such as a hard disk or a non-volatile memory such as a flash memory. The recording medium 156 may be detachably mounted on the information processing device 100.

The input and output interface 158 connects, for example, the operation input device 160 or the display device 162. The operation input device 160 functions as an operation unit (not illustrated) and the display device 162 functions a display unit (not illustrated). Here, examples of the input and output interface 158 include a Universal Serial Bus (USB) terminal, a Digital Visual Interface (DVI) terminal, a High-Definition Multimedia Interface (HDMI) (registered trademark) terminal, and various processing circuits. For example, the operation input device 160 is included in the information processing device 100 and is connected to the input and output interface 158 in the information processing device 100. Examples of the operation input device 160 include a button, a direction key, a rotation type selector such as a jog dial, and a combination thereof. For example, the display device 162 is included in the information processing device 100 and is connected to the input and output interface 158 in the information processing device 100. Examples of the display device 162 include a liquid crystal display (LCD) and an organic electroluminescence (EL) display (also called an organic light emitting diode (OLED) display).

It is needless to say that the input and output interface 158 can be connected to an external device such as an operation input device (for example, a keyboard or a mouse), a display device, or the like serving as an external device of the information processing device 100. Examples of the display device 162 may be a device through which display and a user's operation are possible, such as a touch screen.

The communication interface 164 is a communication unit included in the information processing device 100 and functions as the communication unit 102 that performs wireless/wired communication with an external device such as a device to be controlled and a server via a network (or directly). Here, examples of the communication interface 164 include a communication antenna and a radio frequency (RF) circuit (wireless communication), an IEEE 802.15.1 port and a transmission and reception circuit (wireless communication), an IEEE 802.11b port and a transmission and reception circuit (wireless communication), and a local area network (LAN) terminal and a transmission and reception circuit (wired communication).

The information processing device 100 includes, for example, the configuration illustrated in FIG. 10 and performs the process related to the information processing method according to the embodiment. The hardware configuration of the information processing device 100 according to the embodiment is not limited to the configuration illustrated in FIG. 10.

For example, in a case where the information processing device 100 communicates with an external device such as a device to be controlled or a server via an external communication device connected via, for example, the input and output interface 158, the information processing device 100 does not necessarily need to include the communication interface 164.

The information processing device 100 can be also configured so as not to include, for example, the operation device 160 or the display device 162.

The information processing device 100 may further include, for example, the voice input device such as a microphone and an amplifier circuit for amplifying a voice signal transmitted from the voice input device.

Referring back to FIG. 9, an example of the configuration of the information processing device 100 will be described. The communication unit 102 is a communication unit included in the information processing device 100 and performs wired and wireless communication with an external device such as a device to be controlled and a server via a network (or directly). The communication of the communication unit 102 is controlled by, for example, the control unit 104.

Here, examples of the communication unit 102 include a communication antenna and an RF circuit, and a LAN terminal and a transmission and reception circuit. The configuration of the communication unit 102 is not limited to the foregoing configuration. For example, the communication unit 102 can have a configuration corresponding to any standard capable of performing communication, such as a USB terminal and a transmission and reception circuit or any configuration capable of communicating with an external device via a network.

The control unit 104 includes, for example, an MPU and controls the entire information processing device 100. The control unit 104 includes, for example, the analysis unit 110, the display control unit 112, the log recording control unit 114, and the processing unit 116 and initiatively performs the process related to the information processing method according to the embodiment.

The analysis unit 110 initiatively performs the process (1) (analysis process) and analyzes a character string indicating contents of utterance obtained as a result of speech recognition. Here, the character string indicating the contents of the utterance to be processed according to the embodiment is obtained in such a way that, for example, the constituent elements included in the information processing device 100, such as the control unit 104, perform a process related to speech recognition on voice data showing the contents of the utterance. However, a method of acquiring the character string of the contents of the utterance to be processed according to the embodiment is not limited to the foregoing example. For example, as described above, the information processing device 100 may acquire, from an external device such as a server, data showing the character string of the contents of the utterance obtained as a result of a process related to speech recognition in the external device, thereby obtaining the character string of the contents of the utterance to be processed.

The analysis unit 110 may correct fluctuation of the speech recognition by, for example, replacing a word divided by the morphological analysis or the like with the use of the dictionary for fluctuation absorption stored in the storage unit (not illustrated).

The analysis unit 110 may perform the action analysis and the tense analysis on the character string indicating the contents of the utterance with the use of, for example, dictionaries.

Further, for example, the analysis unit 110 can also set a score with respect to the character string indicating the contents of the utterance on the basis of an analysis result. The analysis unit 110 sets the score by performing, for example, the processes of Steps S308 and S310 in FIG. 6.

The display control unit 112 initiatively performs the process (2) (display control process) and displays the character string indicating the contents of the utterance and the analysis result in the analysis unit 110 on the display screen.

The display control unit 112 may display the character string indicating the contents of the utterance so that, for example, the entire character string indicating the contents of the utterance or each word, divided by the morphological analysis or the like, in the character string indicating the contents of the utterance is editable.

In a case in which the fluctuation of the speech recognition is corrected in the analysis unit 110, the display control unit 112 displays, for example, the character string indicating the contents of the utterance in which the fluctuation of the speech recognition has been corrected.

The display control unit 112 may display an application corresponding to the contents of the utterance and/or a service corresponding to the contents of the utterance on the display screen so that the application and/or the service are/is emphasized on the basis of the analysis result in the analysis unit 110, as illustrated in, for example, C2 in C of FIG. 1.

More specifically, in a case in which, for example, the action analysis is performed on the character string indicating the contents of the utterance in the analysis unit 110, the display control unit 112 emphasizes an application and/or a service displayed on the display screen, for example, on the basis of a result of the action analysis included in the analysis result in the analysis unit 110.

In a case in which the application corresponding to the contents of the utterance and/or the service corresponding to the contents of the utterance are/is displayed on the display screen, the display control unit 112 may determine candidates of applications to be displayed on the display screen and/or candidates of services to be displayed on the display screen, for example, on the basis of performance information of a device to be controlled.

The log recording control unit 114 initiatively performs the log recording control process and causes the analysis result in the analysis unit 110 as a log. Examples of a target on which the log recording control unit 114 records the log include the storage unit (not illustrated), an external recording medium, and an external device communicable via a network (or directly). In a case in which the log is recorded in the external device, for example, the log recording control unit 114 causes the communication unit 102 to transmit log data to the external device.

The processing unit 116 initiatively performs the execution process, and executes a process related to a selected application corresponding to the contents of the utterance or a selected service corresponding to the contents of the utterance.

For example, in a case in which a score is set in the analysis unit 110, the processing unit 116 may perform the process by determining, on the basis of a result of comparison between a set reference value and the set score, a character string for use in execution of the application corresponding to the contents of the utterance or execution of the process related to the service corresponding to the contents of the utterance. More specifically, in a case in which, for example, a score larger than the reference value does not exist, the processing unit 116 uses, in the process, the entire character string indicating the contents of the utterance. Meanwhile, in a case in which a score/scores larger than the reference value exists/exist, the processing unit 116 uses, in the process, one or two or more parts of the character string having the large score/large scores among the character string indicating the contents of the utterance.

In a case in which, for example, the tense analysis is performed in the analysis unit 110 and a result of the tense analysis in the analysis unit 110 indicates that wording indicating tense is included in the character string indicating the contents of the utterance, the processing unit 116 may use, in the process, the wording indicating the tense included in the character string indicating the contents of the utterance as in, for example, Step S324 of FIG. 6.

The control unit 104 includes, for example, the analysis unit 110, the display control unit 112, the log recording control unit 114, and the processing unit 116, and therefore initiatively performs the process related to the information processing method according to the embodiment.

With, for example, the configuration illustrated in FIG. 9, the information processing device 100 performs the process related to the information processing method according to the embodiment (for example, the process (1) (analysis process), the process (2) (display control process), the execution process, and the log recording control process).

Therefore, with, for example, the configuration illustrated in FIG. 9, the information processing device 100 can improve usability for a user. Further, with, for example, the configuration illustrated in FIG. 9, the information processing device 100 can exert an effect obtained by performing the process related to the information processing method according to the embodiment described above.

Note that the configuration of the information processing device 100 according to the embodiment is not limited to the configuration illustrated in FIG. 9.

For example, the information processing device 100 according to the embodiment does not necessarily include both or one of the log recording control unit 114 and the processing unit 116. Even in a case in which the information processing device 100 according to the embodiment does not include both or one of the log recording control unit 114 and the processing unit 116, the information processing device 100 according to the embodiment can initiatively perform the process (1) (analysis process) and the process (2) (display control process) related to the information processing method according to the embodiment.

Therefore, even in a case in which the information processing device 100 according to the embodiment does not include both or one of the log recording control unit 114 and the processing unit 116, the information processing device 100 according to the embodiment can improve usability for a user.

For example, in the information processing device 100 according to the embodiment, one or two or more units of the analysis unit 110, the display control unit 112, the log recording control unit 114, and the processing unit 116 illustrated in FIG. 9 and the control unit 104 can be separately provided (for example, can be achieved by individual processing circuits).

In a case in which, for example, the information processing device 100 according to the embodiment communicates with an external device such as a device to be controlled or a server via an external communication device, the information processing device 100 does not necessarily need to include the communication unit 102.

As described above, the information processing device according to the embodiment performs, for example, the process (1) (analysis process) and the process (2) (display control process) as the process related to the information processing method according to the embodiment.

Here, the information processing device according to the embodiment displays the character string of the contents of the utterance obtained as a result of the speech recognition on the display screen in the process (2) (display control process), and therefore a user who has performed the utterance can visually grasp how the utterance has been subjected to speech recognition. In the process (2) (display control process), the information processing device according to the embodiment displays the analysis result of the character string of the contents of the utterance in the process (1) (analysis process) together with the character string of the contents of the utterance, and therefore a user who has performed the utterance can visually grasp how the utterance has been analyzed.

Therefore, the information processing device according to the embodiment can improve usability for a user.

For example, the information processing device according to the embodiment displays the character string indicating the contents of the utterance on the display screen so that the character string is editable in the process (2) (display control process).

Thus, by displaying the character string indicating the contents of the utterance so that the character string is editable in the process (2) (display control process), for example, the information processing device according to the embodiment can encourage a user to correct the contents of the utterance and can therefore cause own device (information processing device according to the embodiment) or an external device to perform the process more accurately.

Further, by displaying the character string indicating the contents of the utterance so that the character string is editable in the process (2) (display control process), for example, a situation in which a user needs to perform utterance many times to achieve an action desired by the user is prevented.

Therefore, by displaying the character string indicating the contents of the utterance in the process (2) (display control process) so that the character string is editable, the information processing device according to the embodiment can further improve usability for a user.

In the process (2) (display control process), the information processing device according to the embodiment displays the application corresponding to the contents of the utterance and/or the service corresponding to the contents of the utterance on the basis of the analysis result in the process (1) (analysis process) on the display screen as illustrated in, for example, C2 in C of FIG. 1. Further, the information processing device according to the embodiment displays, for example, the application corresponding to the contents of the utterance and/or the service corresponding to the contents of the utterance on the display screen so that the application and/or the service are/is emphasized.

As described above, by displaying the application corresponding to the contents of the utterance and/or the service corresponding to the contents of the utterance on the basis of the analysis result on the display screen, for example, it is possible to achieve display more suitable for a device to be controlled. The information processing device according to the embodiment displays the analysis result of the contents of the utterance not in one format but in a more suitable format, and therefore ambiguity of the utterance can be absorbed and new content can be found by a user.

Therefore, by displaying the application corresponding to the contents of the utterance and/or the service corresponding to the contents of the utterance on the display screen on the basis of the analysis result in the process (2) (display control process), the information processing device according to the embodiment can further improve usability for a user.

In the foregoing description, the embodiment has been described exemplifying the information processing device. However, the embodiment is not limited to this embodiment. The embodiment is applicable to various devices such as a tablet device, communication devices such as a mobile phone and a smartphone, a video/music playback device (or video/music recording and playback device), a game console, a computer such as a personal computer (PC), and a remote controller. The embodiment is also applicable to, for example, a processing integrated circuit (IC) that can be incorporated into the foregoing devices.

(Information Processing System According to Embodiment)

As described above, the information processing device according to the embodiment can also process a character string indicating contents of utterance obtained as a result of a process of speech recognition in an external device such as a server. In view of this, next, an example of the information processing system according to the embodiment in which the information processing device according to the embodiment can process a character string indicating contents of utterance obtained as a result of a process of speech recognition in an external device will be described.

Figure 11:
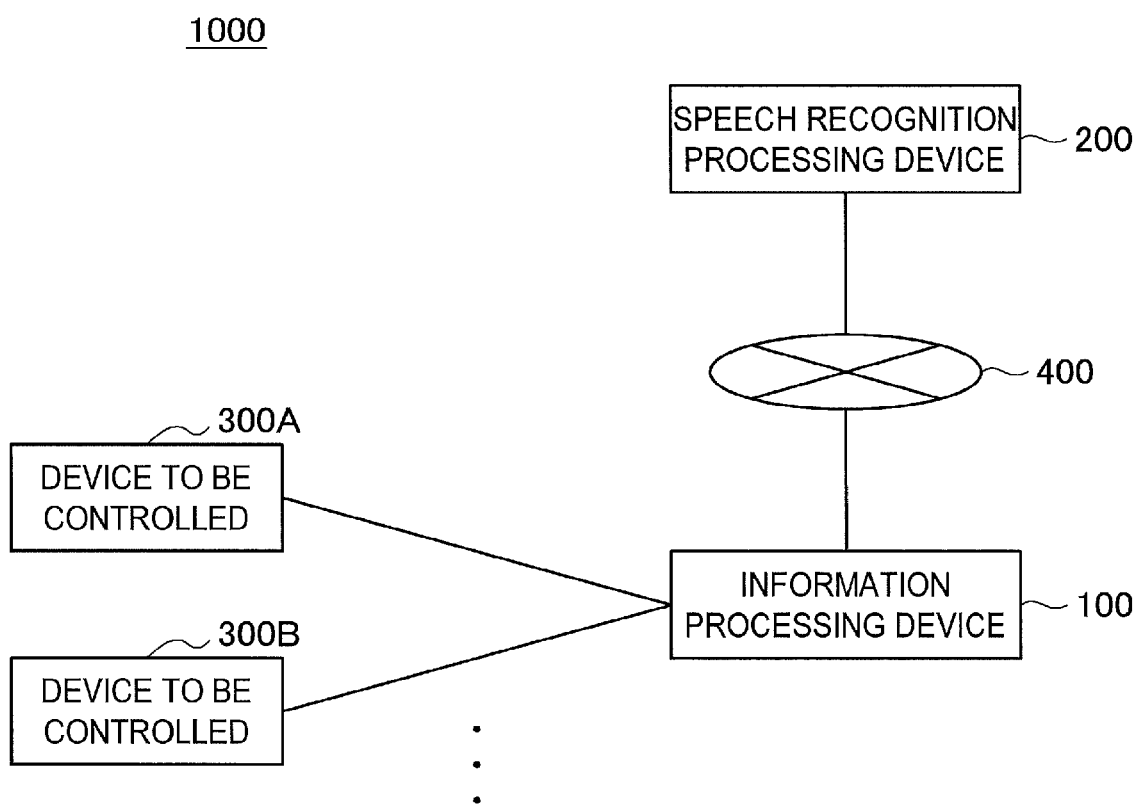
FIG. 11 is an explanatory diagram illustrating an example of an information processing system according to the embodiment.

FIG. 11 is an explanatory diagram illustrating an example of an information processing system 1000 according to the embodiment.

The information processing system 1000 includes, for example, the information processing device 100, a speech recognition processing device 200, devices to be controlled 300A, 300B, . . . (hereinafter, also generally referred to as "device 300 to be controlled") whose functions are controlled by the information processing device 100. The information processing device 100 and the speech recognition processing device 200 communicate with each other via, for example, a network 400. Examples of the network 400 include a wired network such as a LAN or a WAN, a wireless network such as a wireless LAN or a wireless WAN via a base station, and the Internet using a communication protocol such as TCP/IP.

Note that FIG. 11 illustrates an example where the information processing system 1000 includes the plurality of devices to be controlled 300. However, the information processing system according to the embodiment is not limited to the foregoing example. For example, the information processing system according to the embodiment may include a single device 300 to be controlled. In a case in which a target whose function is controlled by the information processing device 100 is own device (information processing device 100), for example, the information processing system according to the embodiment does not necessarily include the devices to be controlled 300A, 300B, . . . illustrated in FIG. 11.

The speech recognition processing device 200 performs, on voice data showing contents of utterance, a process related to speech recognition such as a process using a statistical method or a process using the hidden Markov model. The speech recognition processing device 200 transmits, to the information processing device 100, data showing a character string of the contents of the utterance obtained as a result of the process related to the speech recognition performed on the voice data.

The speech recognition processing device 200 manages, for example, data related to a dictionary (hereinafter, referred to as "dictionary data") according to the embodiment. Note that, in the information processing system according to the embodiment, another device such as a server may manage the dictionary data. By managing the dictionary in an external device such as the speech recognition processing device 200, for example, a behavior in the process (1) (analysis process) in the information processing device 100 can be changed more easily. Hereinafter, an example where the speech recognition processing device 200 manages the dictionary data will be described.

Further, the speech recognition processing device 200 manages, for example, log data. Note that, in the information processing system according to the embodiment, another device such as a server may manage the log data or the information processing device 100 may manage the log data. Hereinafter, the example where the speech recognition processing device 200 manages the log data will be described.

Here, the speech recognition processing device 200 has the hardware configuration illustrated in, for example, FIG. 10. However, the hardware configuration of the speech recognition processing device 200 is not limited to the foregoing example.

The information processing device 100 performs the process related to the information processing method according to the embodiment described above on the data showing the character string of the contents of the utterance transmitted from the speech recognition processing device 200.

The device 300 to be controlled, for example, performs a process on the basis of a control command transmitted from the information processing device 100 and a function thereof is controlled by the information processing device 100. Here, the device 300 to be controlled has the hardware configuration illustrated in, for example, FIG. 10. However, the hardware configuration of the device 300 to be controlled is not limited to the foregoing example.

With the configuration illustrated in, for example, FIG. 11, it is possible to achieve the information processing system in which the information processing device 100 can process the character string indicating the contents of the utterance obtained as a result of the process of the speech recognition performed in the speech recognition processing device 200 (example of external device).

Next, an example of a process in the information processing system 1000 will be described. FIG. 12 is an explanatory diagram illustrating an example of a process in the information processing system 1000 according to the embodiment. Here, a process of Step S414 in FIG. 12 corresponds to the process (1) (analysis process), and a process of Step S418 in FIG. 12 corresponds to the process (2) (display control process). Steps S416 and S420 in FIG. 12 indicate an example of the execution process according to the embodiment, and Step S422 in FIG. 12 corresponds to the log recording control process according to the embodiment.

The information processing device 100 and the device 300 to be controlled perform a connection process (S400). Here, the process of Step S400 is performed in such a way that, for example, the information processing device 100 transmits a connection request to the device 300 to be controlled on the basis of user's connection operation.

When the information processing device 100 and the device 300 to be controlled are connected in Step S400, the information processing device 100 specifies performance of the device 300 to be controlled (S402). The information processing device 100 transmits, for example, a performance information transmission request for instructing transmission of performance information to the device 300 to be controlled and specifies the performance of the device 300 to be controlled on the basis of the performance information transmitted from the device 300 to be controlled in response to the performance information transmission request.

The information processing device 100 transmits, for example, a dictionary update check request to the speech recognition processing device 200 (S404).

The speech recognition processing device 200 that has received the dictionary update check request transmitted from the information processing device 100 in Step S404 checks dictionary data stored in the recording medium 156 or the like. In a case in which the dictionary data is updated, the speech recognition processing device 200 transmits the dictionary data to the information processing device 100 (S406). By performing the process of Step S406, a dictionary according to the embodiment stored in, for example, the storage unit (not illustrated) included in the information processing device 100 is updated. Here, for example, the speech recognition processing device 200 may transmit the dictionary data showing the entire dictionary or may transmit only data corresponding to an updated part as the dictionary data.

When voice data of utterance is obtained, the information processing device 100 transmits the voice data to the speech recognition processing device 200 (S408).

The speech recognition processing device 200 that has received the voice data transmitted from the information processing device 100 in Step S408, performs a process related to speech recognition on the voice data (S410). Then, the speech recognition processing device 200 transmits, to the information processing device 100, data showing a character string of contents of the utterance obtained as a result of the process related to the speech recognition (S412).

The information processing device 100 that has received the data showing the character string of the contents of the utterance transmitted from the speech recognition processing device 200 in Step S412 performs an analysis process on the data showing the character string of the contents of the utterance (S414).

The information processing device 100 searches content on the basis of an analysis result in Step S414 (S416). Here, examples of a target whose content is searched by the information processing device 100 include the storage unit (not illustrated), an external recording medium such as an optical disk, and an external device such as the speech recognition processing device 200.

As a specific example, the information processing device 100 performs, in cooperation with content search engine in an external device such as the speech recognition processing device 200, for example, program search in a connected television receiver (example of device 300 to be controlled) or search of a moving image and music of a cooperative service on the Internet. Further, for example, the information processing device 100 communicates with the connected television receiver (example of device 300 to be controlled) and searches recorded title content in the television receiver, an application of the television receiver, and the like. Furthermore, for example, the information processing device 100 communicates with a PC (example of device 300 to be controlled) in a home network and searches image data (data showing a moving image and a still image), music data, and the like stored in a recording medium included in the PC. Still further, the information processing device 100 performs, for example, Web search. The information processing device 100 may also search, for example, a disk inserted into a disk player (example of device 300 to be controlled).

The information processing device 100 displays the character string of the contents of the utterance and the analysis result in Step S414 on the display screen (S418). Further, for example, the information processing device 100 may display an application corresponding to the contents of the utterance and/or a service corresponding to the contents of the utterance on the display screen on the basis of the analysis result in Step S414 and a search result in Step S416, as illustrated in C2 in C of FIG. 1.

For example, in a case in which it is detected that operation (operation for causing the device 300 to be controlled to perform an action) is performed on the application or the service on the screen displayed in Step S418, the information processing device 100 transmits a control command corresponding to the operation to the device 300 to be controlled (S420).

The information processing device 100 also transmits, to the speech recognition processing device 200, for example, a log of the analysis result in Step S414 or log data showing a log in each process (S422).

The process illustrated in, for example, FIG. 12 is performed in the information processing system 1000. Here, even in a case in which the process illustrated in FIG. 12 is performed, the information processing device 100 can perform the process related to the information processing method according to the embodiment described above. Therefore, by performing the process illustrated in, for example, FIG. 12, the information processing system that can improve usability for a user is achieved. It is needless to say that the process in the information processing system 1000 according to the embodiment is not limited to the process illustrated in FIG. 12.

The foregoing description has been described exemplifying the speech recognition processing device 200 as a constituent element of the information processing system according to the embodiment. However, the embodiment is not limited to this embodiment. The embodiment is applicable to various devices such as computers including a PC and a server. The embodiment is also applicable to, for example, a processing IC that can be incorporated into the foregoing devices.

The process related to the speech recognition processing device 200 according to the embodiment may be achieved by a system including a plurality of devices on the assumption of connection to a network (or communication between devices) such as cloud computing.

The foregoing description has been described exemplifying the device 300 to be controlled as a constituent element of the information processing system according to the embodiment. However, the embodiment is not limited to this embodiment. The embodiment is applicable to various devices such as a television receiver, computers such as a PC and a server, a video/music playback device (or video/music recording and playback device), and a game console. The embodiment is also applicable to, for example, a processing IC that can be incorporated into the foregoing devices.

Program According to Embodiment

A program for causing a computer to function as the information processing device according to the embodiment (for example, programs capable of causing execution of the processes related to the information processing method according to the embodiment such as "the process (1) (analysis process) and the process (2) (display control process)", "the process (1) (analysis process), the process (2) (display control process), and the execution process", "the process (1) (analysis process), the process (2) (display control process), and the log recording control process", and "the process (1) (analysis process), the process (2) (display control process), the execution process, and the log recording control process") is executed in the computer. This makes it possible to improve usability for a user. Further, because the program for causing the computer to function as the information processing device according to the embodiment is executed in the computer, it is possible to exert an effect obtained by performing the process related to the information processing method according to the embodiment described above.

It should be understood by those skilled in the art that various modifications, combinations, sub-combinations and alterations may occur depending on design requirements and other factors insofar as they are within the scope of the appended claims or the equivalents thereof.

For example, the program (computer program) causing the computer to function as the information processing device according to the embodiment has been provided above.

However, the embodiment can also provide a recording medium storing the foregoing program.

The above-described configuration is an example of the embodiment and, of course, pertains to the technical scope of an embodiment of the present disclosure.

Additionally, the present technology may also be configured as below.

(1)

An information processing device including:

an analysis unit configured to analyze a character string indicating contents of utterance obtained as a result of speech recognition; and a display control unit configured to display the character string indicating the contents of the utterance and an analysis result on a display screen.

(2)

The information processing device according to (1), wherein the display control unit displays the character string indicating the contents of the utterance in a state in which the character string is editable.

(3)

The information processing device according to (1) or (2), wherein the analysis unit corrects fluctuation of the speech recognition, and wherein the display control unit displays the character string indicating the contents of the utterance in which the fluctuation has been corrected.

(4)

The information processing device according to any one of (1) to (3), wherein the display control unit displays an application corresponding to the contents of the utterance and/or a service corresponding to the contents of the utterance on a display screen in a manner that the application and/or the service are/is emphasized on the basis of the analysis result.

(5)

The information processing device according to (4), wherein the analysis unit performs action analysis on the character string indicating the contents of the utterance, and wherein the display control unit displays the application and/or the service on the display screen in a manner that the application and/or the service are/is emphasized on the basis of a result of the action analysis included in the analysis result.

(6)

The information processing device according to (4) or (5), wherein the display control unit determines a candidate of the application to be displayed on the display screen and/or a candidate of the service to be displayed on the display screen on the basis of performance information indicating performance that the device has.

(7)

The information processing device according to any one of (4) to (6), further including:

a processing unit configured to execute a process related to a selected application corresponding to the contents of the utterance or a selected service corresponding to the contents of the utterance.

(8)

The information processing device according to (7), wherein the analysis unit sets a score with respect to the character string indicating the contents of the utterance on the basis of a result of syntactic analysis performed on the character string indicating the contents of the utterance or on the basis of a result of semantic analysis performed on the result of the syntactic analysis and the character string indicating the contents of the utterance, and wherein the processing unit uses, in the process, the entire character string indicating the contents of the utterance in a case in which the score larger than a reference value or the score equal to or larger than the reference value does not exist, and uses, in the process, one or two or more parts of the character string having a large score among the character string indicating the contents of the utterance in a case in which the score larger than the reference value or the score equal to or larger than the reference value exists.

(9)

The information processing device according to (7) or (8), wherein the analysis unit performs tense analysis on the character string indicating the contents of the utterance, and wherein, in a case in which a result of the tense analysis indicates that wording indicating tense is included in the character string indicating the contents of the utterance, the processing unit uses, in the process, the wording indicating tense included in the character string indicating the contents of the utterance.

(10)

The information processing device according to any on of (1) to (9), further including:

a log recording control unit configured to cause the analysis result to be recorded as a log.

(11)

An information processing method including:

a step of analyzing a character string indicating contents of utterance obtained as a result of speech recognition; and a step of displaying the character string indicating the contents of the utterance and an analysis result on a display screen.

(12)

A program for causing a computer to execute:

a step of analyzing a character string indicating contents of utterance obtained as a result of speech recognition; and a step of displaying the character string indicating the contents of the utterance and an analysis result on a display screen.

REFERENCE SIGNS LIST

100 information processing device
102 communication unit
104 control unit
110 analysis unit
112 display control unit
114 log recording control unit
116 processing unit
200 speech recognition processing device
300, 300A, 300B device to be controlled
400 network
1000 information processing system

The invention claimed is:

1. An information processing device, comprising:
processing circuitry configured to analyze a character string indicating contents of an utterance to obtain a particular word included in the character string, and determine, using a first memory associating keywords and corresponding actions, a particular action associated with the obtained particular word, the character string being obtained as a result of speech recognition performed on the utterance; and
display control circuitry configured to display the character string indicating the contents of the utterance, determine, using a second memory associating actions and corresponding applications and/or services, a particular application and/or a particular service associated with the determined particular action, and display the particular application and/or the particular service corresponding to the contents of the utterance on a display screen, wherein
the processing circuitry is further configured to execute a process related to the particular application or the particular service corresponding to the contents of the utterance.

2. The information processing device according to claim 1, wherein the display control circuitry is further configured to determine a candidate of the particular application to be displayed on the display screen and/or a candidate of the particular service to be displayed on the display screen, based on performance information indicating performance of the device.

3. The information processing device according to claim 1, wherein the displayed character string indicating the contents of utterance is editable by an input operation.

4. The information processing device according to claim 1, wherein the processing circuitry is further configured to set a score with respect to the character string indicating the contents of the utterance based on a result of syntactic analysis performed on the character string indicating the contents of the utterance or based on a result of semantic analysis performed on the result of the syntactic analysis and the character string indicating the contents of the utterance.

5. The information processing device according to claim 4, wherein
the processing circuitry is further configured to execute a content search process that uses the character string indicating the contents of the utterance, as a process related to a selected service corresponding to the contents of the utterance,
when the score larger than a reference value or the score equal to or larger than the reference value does not exist, the processing circuitry is further configured to execute the content search process using the entire character string indicating the contents of the utterance, and
when the score larger than the reference value or the score equal to or larger than the reference value exists, the processing circuity is further configured to execute the content search process using one or more parts of the character string having the larger score among the character string indicating the contents of the utterance.

6. The information processing device according to claim 5, wherein
the processing circuity is further configured to determine whether or not a certain word indicating tense is included in the character string indicating the contents of the utterance, and
when the determination indicates that the certain word indicating tense is included in the character string indicating the contents of the utterance, the processing circuity is further configured to execute the content search process based on the certain word indicating the tense.

7. An information processing method, comprising:
analyzing a character string indicating contents of an utterance to obtain a particular word included in the character string, and determining, using a first memory associating keywords and corresponding actions, a particular action associated with the obtained particular word, the character string being obtained as result of speech recognition performed on the utterance; and
displaying the character string indicating the contents of the utterance, determining, using a second memory associating actions and corresponding applications and/ or services, a particular application and/or a particular service associated with the determined particular action, and displaying the particular application and/or the particular service corresponding to the contents of the utterance on a display screen, wherein the method further includes executing a process related to the particular application or the particular service corresponding to the contents of the utterance.

8. The information processing method according to claim 7, further comprising determining a candidate of the particular application to be displayed on the display screen and/or a candidate of the particular service to be displayed on the display screen based on performance information.

9. The information processing method according to claim 7, wherein the displayed character string indicating the contents of utterance is editable by an input operation.

10. The information processing method according to claim 7, further comprising setting a score with respect to the character string indicating the contents of the utterance based on a result of syntactic analysis performed on the character string indicating the contents of the utterance or based on a result of semantic analysis performed on the result of the syntactic analysis and the character string indicating the contents of the utterance.

11. The information processing method according to claim 10, further comprising:
executing a content search process that uses the character string indicating the contents of the utterance, as a process related to the selected service corresponding to the contents of the utterance, wherein
in a case in which when the score larger than a reference value or the score equal to or larger than the reference value does not exist, the content search process is executed using the entire character string indicating the contents of the utterance, and
when the score larger than the reference value or the score equal to or larger than the reference value exists, the content search process is executed using one or more parts of the character string having the larger score among the character string indicating the contents of the utterance.

12. The information processing method according to claim 11, further comprising:
determining whether or not a certain word indicating tense is included in the character string indicating the contents of the utterance,
wherein, when the determination indicates that the certain word indicating tense is included in the character string indicating the contents of the utterance, the content search process is executed based on the certain word indicating the tense.

* * * * *